US010502832B2

United States Patent
Tehrani Niknejad et al.

(10) Patent No.: US 10,502,832 B2
(45) Date of Patent: Dec. 10, 2019

(54) OBJECT RECOGNITION APPARATUS AND NOISE REMOVAL METHOD

(71) Applicants: DENSO CORPORATION, Kariya, Aichi-pref. (JP); TOYOTA SCHOOL FOUNDATION, Nagoya-shi, Aichi-ken (JP)

(72) Inventors: Hossein Tehrani Niknejad, Kariya (JP); Utsushi Sakai, Kariya (JP); Takashi Ogawa, Kariya (JP); Seiichi Mita, Nagoya (JP); Qiwei Xie, Nagoya (JP)

(73) Assignees: DENSO CORPORATION, Kariya, Aichi-pref. (JP); TOYOTA SCHOOL FOUNDATION, Nagoya-shi, Aichi-ken (JP)

( * ) Notice: Subject to any disclaimer, the term of this patent is extended or adjusted under 35 U.S.C. 154(b) by 859 days.

(21) Appl. No.: 15/055,239

(22) Filed: Feb. 26, 2016

(65) Prior Publication Data
US 2016/0252617 A1 Sep. 1, 2016

(30) Foreign Application Priority Data
Feb. 27, 2015 (JP) .................. 2015-038919

(51) Int. Cl.
*G01C 3/08* (2006.01)
*G01S 17/42* (2006.01)
(Continued)

(52) U.S. Cl.
CPC ............ *G01S 17/42* (2013.01); *G01S 7/4802* (2013.01); *G01S 7/4808* (2013.01); *G01S 17/936* (2013.01)

(58) Field of Classification Search
CPC ...... G01S 17/42; G01S 7/4802; G01S 7/4808; G01S 17/936
See application file for complete search history.

(56) References Cited

U.S. PATENT DOCUMENTS

| 2009/0109421 A1 | 4/2009 | Iwasawa |
| 2011/0248880 A1 | 10/2011 | Miyahara et al. |

(Continued)

FOREIGN PATENT DOCUMENTS

| EP | 2910974 | 8/2015 |
| JP | 2000-009841 A | 1/2000 |

*Primary Examiner* — Samantha K Abraham
(74) *Attorney, Agent, or Firm* — Knobbe, Martens, Olson & Bear, LLP

(57) ABSTRACT

In an object recognition apparatus, a range point acquirer irradiates each of irradiation areas arranged in a horizontally and vertically extending grid and forming a detection area for detecting a target with laser light and receives the reflected light from the respective irradiation areas, thereby acquiring a plurality of range points representing per-irradiation area coordinates of the target. A noise remover is configured to, based on either or both of degrees of angle proximity and degrees of distance proximity between a plurality of subject range points to be determined whether to be a noise point, of the plurality of range points, as viewed from a reference point, determine whether or not each of the subject range points is a noise point, and remove the noise point from the plurality of range points. An object recognizer uses the plurality of range points other than the noise points to recognize the object.

22 Claims, 17 Drawing Sheets

(51) Int. Cl.
*G01S 17/93* (2006.01)
*G01S 7/48* (2006.01)

(56) References Cited

U.S. PATENT DOCUMENTS

2015/0109290 A1* 4/2015 Chang .................... G06T 17/00
 345/420
2015/0198735 A1* 7/2015 Muensterer ............ G01S 17/89
 702/5

* cited by examiner

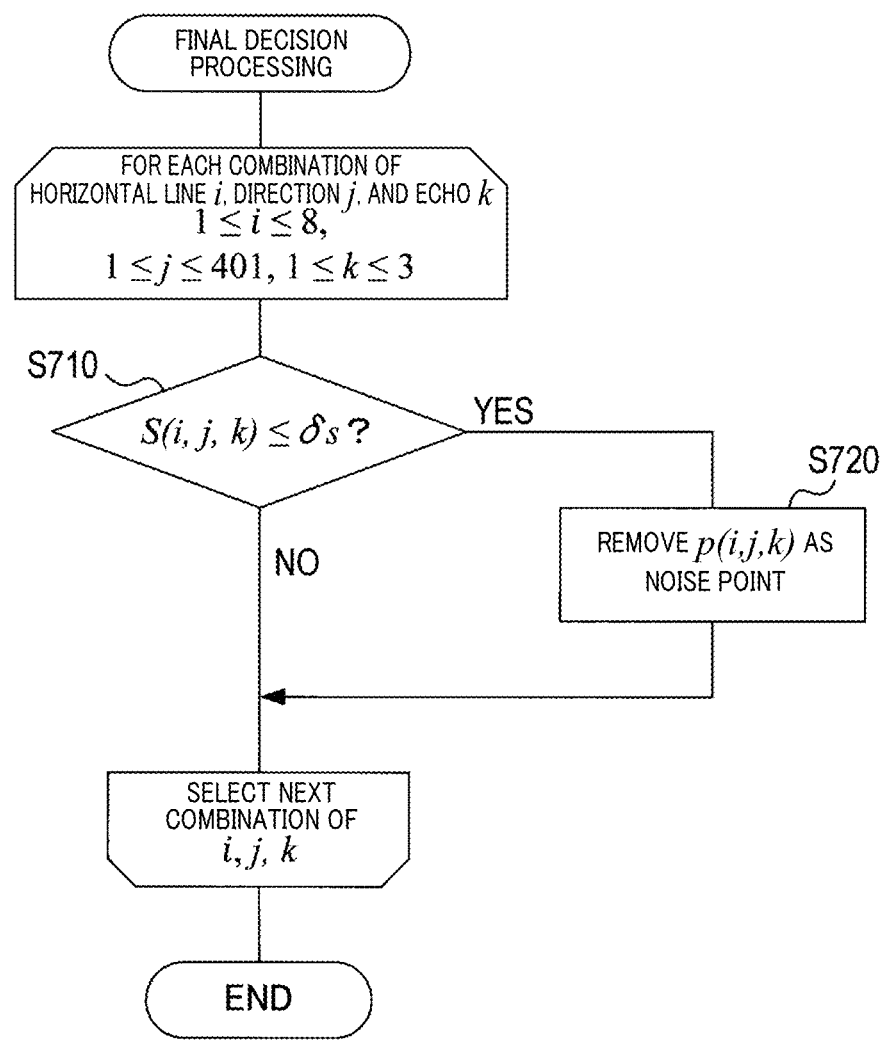

OBJECT RECOGNITION APPARATUS AND NOISE REMOVAL METHOD

CROSS-REFERENCE TO RELATED APPLICATION

This application is based on and claims the benefit of priority from earlier Japanese Patent Application No. 2015-38919 filed Feb. 27, 2015, the descriptions of which are incorporated herein by reference.

BACKGROUND

Technical Field

The present invention relates to an object recognition apparatus for removing noise points from a plurality of range points to recognize objects and a noise removal method for removing the noise points.

Related Art

A known object recognition apparatus, as disclosed in Japanese Patent Application Laid-Open Publication No. 2000-009841, repeatedly acquires range points using laser radar mounted in a vehicle (hereinafter referred to as a subject vehicle), counts only those of the acquired ranging points, received light levels from which are higher than a threshold, and recognizes objects using only the counted range points. That is, the disclosed object recognition apparatus employs a noise removal method for removing range points counted less than a predetermined number of times as noise points.

However, there are some problems with the above noise removal method. For example, when a relative speed of an object to the subject vehicle increases, a range point of the object that has been counted becomes more likely to fail to be counted than before. That is, in such a case, a range point that is not actually a noise point may be removed incorrectly as a noise point.

In addition, a received light level from a range point of a less reflective object is more likely to be lower than the threshold, so that the range point becomes more likely to fail to be counted. That is, also in such a case, a range point of a less reflective object may be removed incorrectly as a noise point.

In consideration of the foregoing, exemplary embodiments of the present invention are directed to providing techniques for accurately removing noise points from a plurality of range points.

SUMMARY

In accordance with an exemplary embodiment of the present invention, there is provided an object recognition apparatus for recognizing an object as a target. In the apparatus, a range point acquirer is configured to irradiate each of irradiation areas arranged in a horizontally and vertically extending grid and forming a detection area for detecting a target with laser light and receive the reflected light from the respective irradiation areas, thereby acquiring a plurality of range points representing per-irradiation area coordinates of the target. A noise remover is configured to, based on either or both of degrees of angle proximity and degrees of distance proximity between a plurality of subject range points to be determined whether to be a noise point, of the plurality of range points, as viewed from a reference point, determine whether or not each of the subject range points is a noise point, and remove the noise points from the plurality of range points. An object recognizer is configured to use the plurality of range points other than the noise points to recognize the object.

With this configuration, a noise point can be determined based on properties characteristic of the noise point in angular differences or distance differences between the subject range points, of the plurality of range points, as viewed from the reference point. This allows the noise point to be removed accurately.

In accordance with another exemplary embodiment of the present invention, there is provided a noise removal method for removing noise points from a plurality of range points, the method including steps of: irradiating each of irradiation areas arranged in a horizontally and vertically extending grid and forming a detection area for detecting a target with laser light and receiving the reflected light from the respective irradiation areas, thereby acquiring a plurality of range points representing per-irradiation area coordinates of the target; based on either or both of degrees of angle proximity and degrees of distance proximity between a plurality of subject range points to be determined whether to be a noise point, of the plurality of range points, as viewed from a reference point, determining whether or not each of the subject range points is a noise point; and removing the noise points from the plurality of range points.

The noise removal method configured as above also allows the noise point to be removed accurately.

BRIEF DESCRIPTION OF THE DRAWINGS

FIG. 15 is a flowchart of final decision processing in accordance with a modification.

DESCRIPTION OF SPECIFIC EMBODIMENTS

Embodiments of the present invention will now be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

(Driving Assistance System)

Figure 1A:
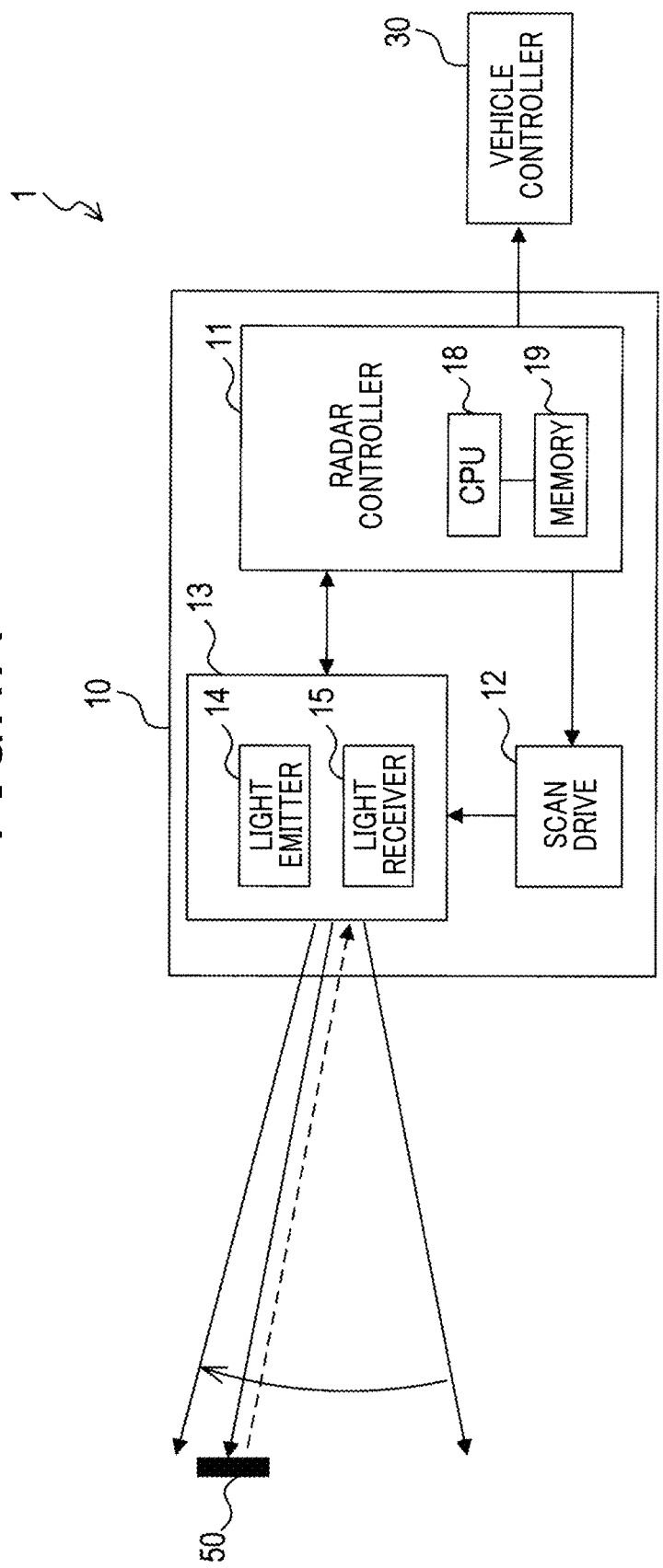
FIG. 1A is a block diagram of a driving assistance system in accordance with one embodiment of the present invention.
Figure 2:
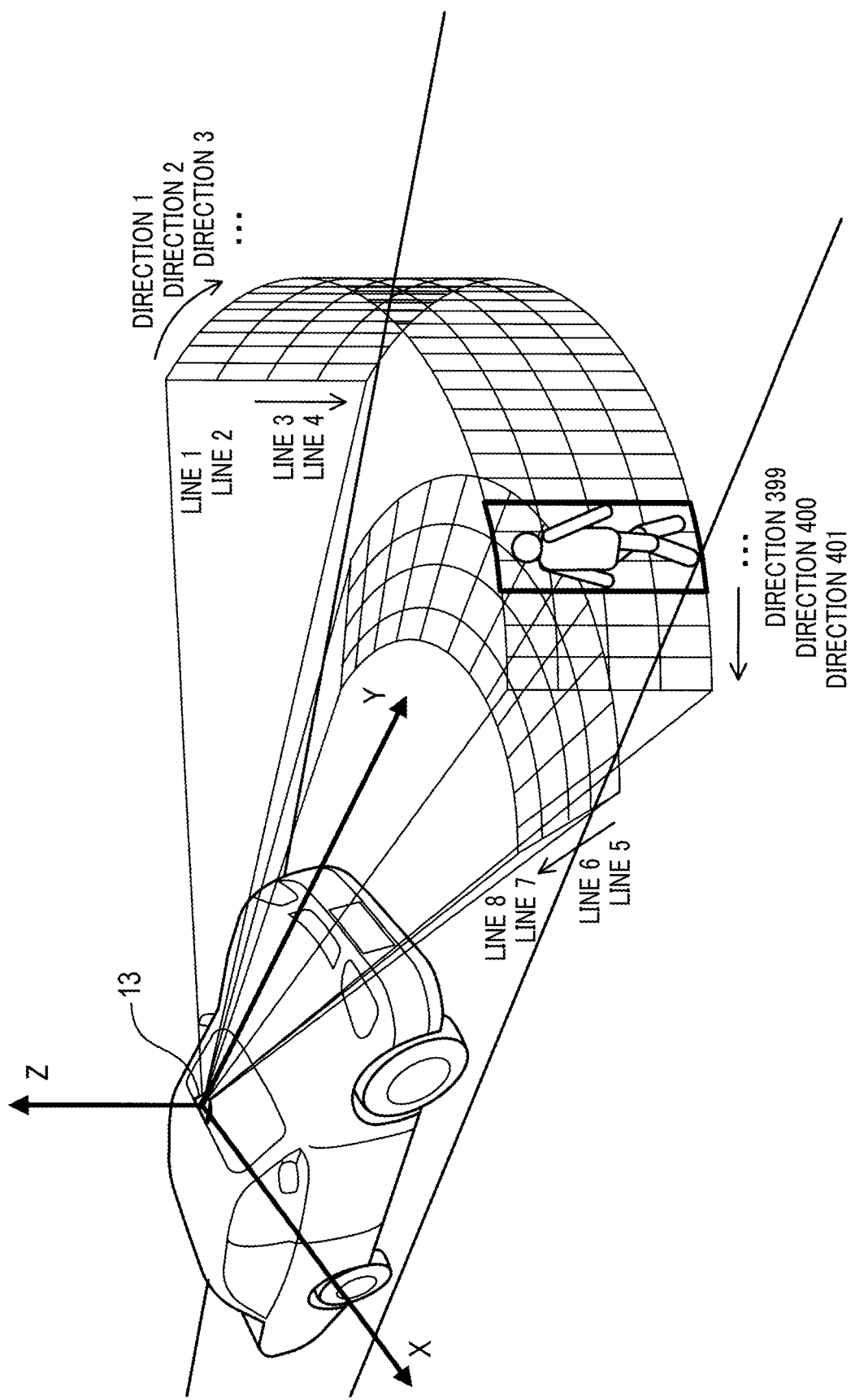
FIG. 2 is a diagram schematically illustrating an area to be irradiated by laser light.

FIG. 1A is a block diagram of a driving assistance system 1 in accordance with one embodiment of the present invention. FIG. 2 is a diagram schematically illustrating an area to be irradiated by laser light. The driving assistance system 1 is mounted in a vehicle, such as a passenger vehicle, and includes a radar device 10 and a vehicle controller 30 as shown in FIG. 1A.

The radar device 10 includes a radar controller 11, a scan drive 12, and an optics unit 13.

The radar controller 11 may be configured as a well-known computer formed of a central processing unit (CPU) 18 and a memory 19 including a read only memory (ROM), a random access memory (RAM) and the like. The CPU 18 is operative to perform various processes, such as an object recognition process (described later) and the like, by executing programs stored in the memory 19. The radar controller 11 may be implemented in hardware, such as electronic circuits.

The scan drive 12 is configured as an actuator of a motor or the like to arbitrarily direct the optics unit 13 in both horizontal and vertical directions in response to a command from the radar controller 11. The scan drive 12 is configured to drive the optics unit 13 each time the scan drive 12 receives a start-of-scan signal from the radar controller 11 so that the optics unit 13 can acquire reflected light from the whole area to be irradiated by the laser light during one cycle of scan.

The optics unit 13 includes a light emitter 14 configured to emit laser light in response to a command from the radar controller 11, and a light receiver 15 configured to receive its reflected light (indicated by the solid lines in FIG. 1A) from an object 50.

The scan drive 12 can be any type of scan drive having a suitable configuration such that an emission direction of the laser light from the light emitter 14 is the same direction as a direction from which the light receiver 15 can receive its reflected light. Therefore, for example, the scan drive 12 may be configured to drive a mirror that can direct the laser light and its reflected light in an arbitrary direction as an alternative to the optics unit 13.

Where the scan drive 12 may be configured to scan the laser light not only in the horizontal direction, but also in the vertical direction, by rotating a mirror having a plurality of reflective surfaces tilted at different angles, or by directing a mirror having a single reflective surface to an arbitrary direction.

Alternatively, the scan drive 12 may be configured to change only the direction of the light receiver 15, where the light emitter 14 may be configured to irradiate part or whole of the area to be scanned with the laser light without changing the direction of the light emitter 14.

As described above, the radar device 10 is configured as laser radar to intermittently emit the laser light as an electromagnetic wave to scan a predefined area in an arbitrary direction around the subject vehicle (in the forward direction, i.e., the traveling direction, of the subject vehicle in the present embodiment) and receive its reflected wave, thereby detecting an object located forward of the subject vehicle as a range point.

In the radar device 10 of the present embodiment, the radar controller 11 utilizes the scan drive 12 to scan the laser light emitted from the optics unit 13 over the predefined area. Specifically, as shown in FIG. 2, the laser light is scanned along a top row from an upper left corner to an upper right corner intermittently at equal spatial intervals (or at equal angular intervals) and then the laser light is scanned from left to right in each succeeding row extending from the top to the bottom of the predefined area at predetermined angular intervals.

The radar device 10 is configured to, each time the laser light is emitted, detect an object (range point) based on the reflected light detection timing and the laser light emission direction.

The whole area to be irradiated with the laser light is diced into multiple segments. Each segment is assigned a pair of numbers: a direction number and a line number. For example, as shown in FIG. 2, segments in each horizontal row are numbered from left to right. Numbers assigned to these segments in each horizontal row are referred to as "direction numbers". The horizontal rows are numbered from top to bottom. Numbers assigned to the horizontal rows are referred to as "line numbers". In the present embodiment, the segments in each horizontal row are numbered 1-401 from left to right. The upper four rows are numbered 1-4 and the lower four rows are numbered 5-8 from top to bottom of the predetermined area.

Figure 3:
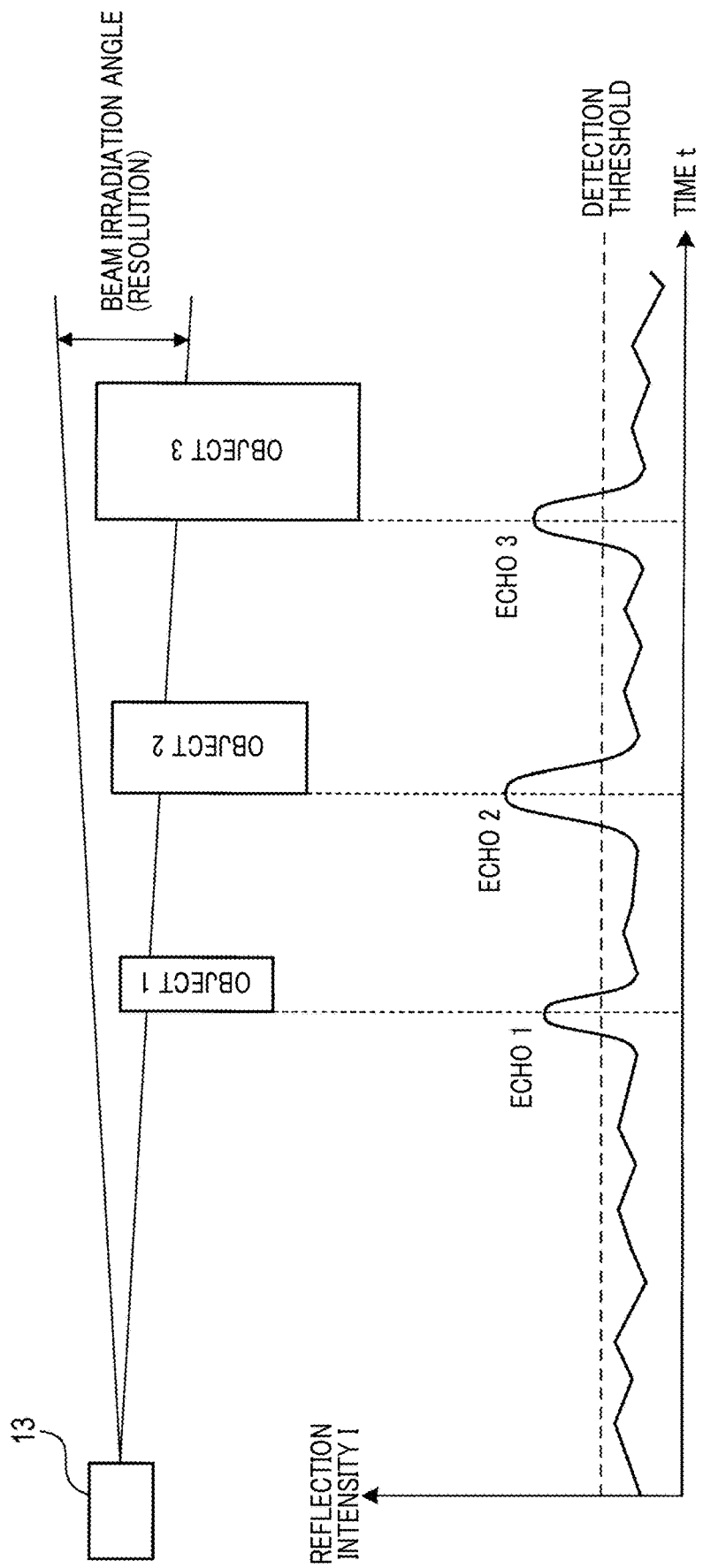
FIG. 3 is an example of multiple echoes.

In addition, the radar device 10 of the present embodiment supports multiple echoes. As shown in FIG. 3, if the laser light emitted at one time is reflected from a plurality of objects (e.g., objects, 1, 2, 3), a plurality of signals (multiple echoes) indicative of the respective objects may be detected. In such a case, positions of the closest up to three range points to the subject vehicle and intensities of reflected waves from these range points are recorded. The closest up to three range points are numbered in the order of increasing distance from the subject vehicle, and numbers assigned to such range points are referred to as "echo numbers".

Various processes, such as a process of controlling a vehicle's behavior and a process of providing a notification to a vehicle's driver, are to be performed in the vehicle controller 30 that may be configured as a computer including a central processing unit (CPU), a random access memory (RAM), a read only memory (ROM) and the like. These processes may be implemented by the CPU executing computer programs stored in the ROM or the like. For example, the vehicle controller 30 may be configured to, upon receipt of a driving assistance command from the radar device 10 for changing the behavior of the subject vehicle or prompting the user to change the behavior of the subject vehicle, output a control signal corresponding to the command to at least one of a display unit, an audio output device, a braking system, a steering system and the like.

(Object Recognition Processing)

The object recognition processing is performed in the driving assistance system 1 described above. In the object recognition processing shown in FIG. 4, noise points are removed as noise from range points acquired using the optics unit 13, and the remaining range points after removing the noise points are used to recognize types and shapes of objects. The noise points are range points other than range points used for ranging purposes, such as noise arising from rain, snow, dust, stream and the like.

Figure 4:
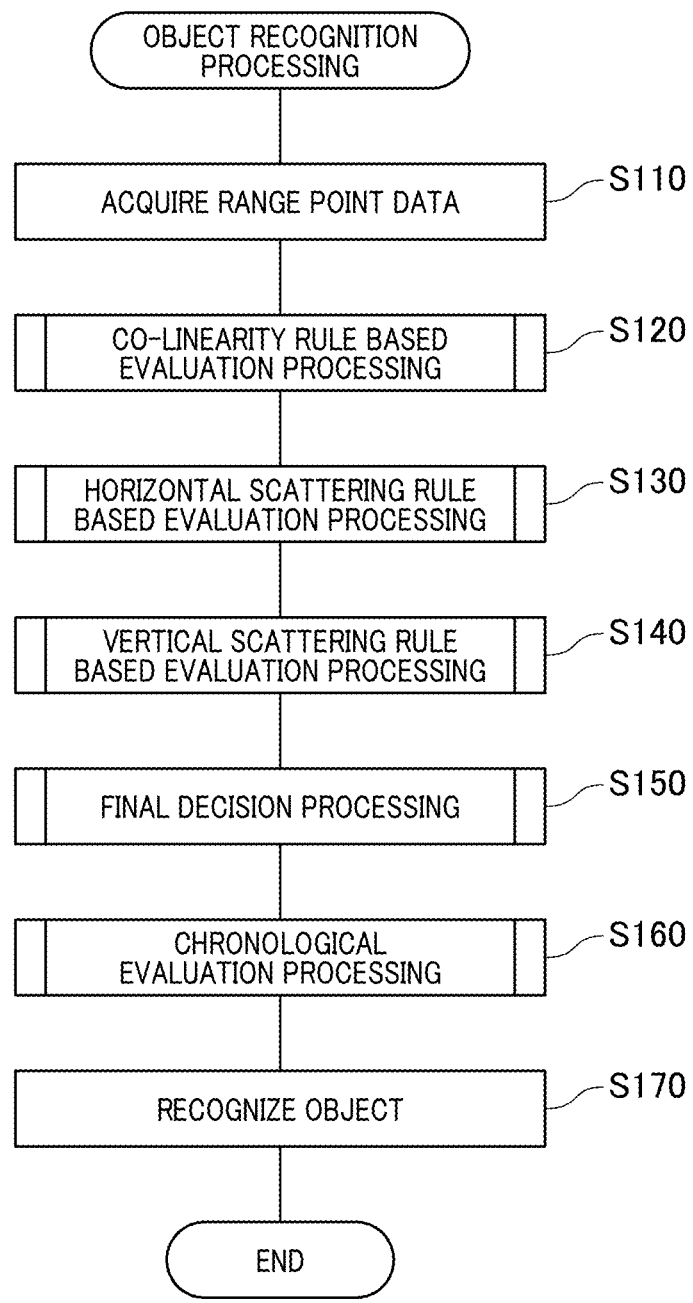
FIG. 4 is a flowchart of object recognition processing to be performed in the radar controller.

The object recognition processing is launched each time one cycle of range points are acquired. More specifically, as shown in FIG. 4, range point cloud data is acquired in step S110. The range point cloud data is per-irradiation area data of one cycle of range points representing coordinates of a target or targets. The range point cloud data includes information of coordinates and reflection intensity of each range point.

Subsequently, in steps S120-S160, noise removal processing is performed. First, in step S120, co-linearity rule based evaluation processing is performed.

In the co-linearity rule based evaluation processing, for each range point, an evaluation value to evaluate whether or not the range point is a noise point is set utilizing a feature that a noise point and a range point of the target are colinear. Given two range points, the co-linearity is indicative of a degree of proximity of one of the two range points to a line passing through the optics unit 13 (the light emitter or the light receiver) as a reference point and the other range point. For each line number i (1≤i≤8), the co-linearity rule based evaluation processing is performed for each combination of the direction number j (1≤j≤401) and the echo number k (1≤k≤3).

Figure 5:
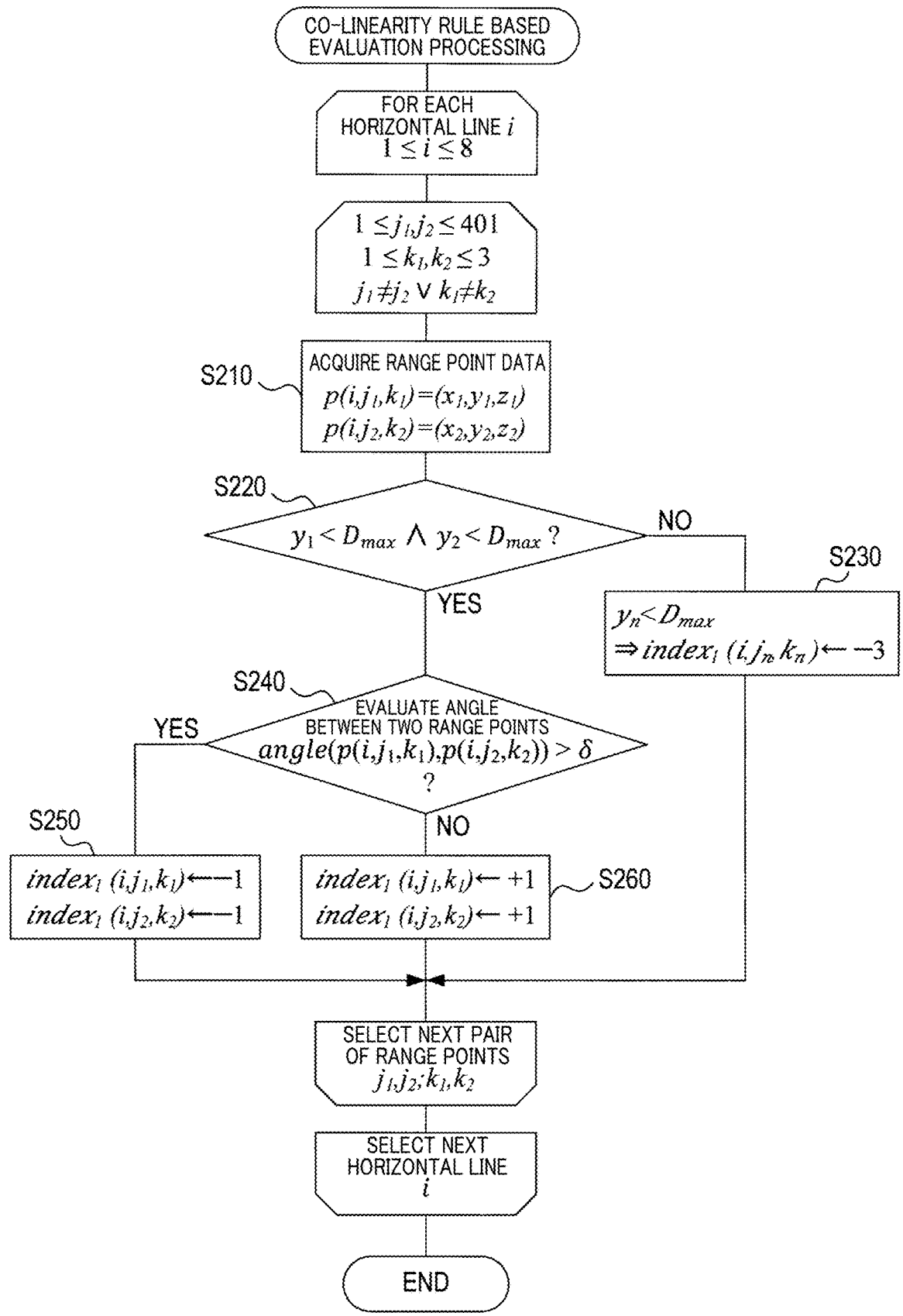
FIG. 5 is a flowchart of co-linearity rule based evaluation processing.

In the co-linearity rule based evaluation processing, as shown in FIG. 5, data of two different points determined in a predetermined order, for example, denoted by p(i, j1, k1)=(x1, y1, z1), p(i, j2, k2)=(x2, y2, z2) where (j1, k1)≠(j2, k2), are acquired from per-irradiation area data of range points in step S210. Each time the co-linearity rule based evaluation processing is repeated, the combination of such two points is changed. If all combinations have been selected, then the processing ends.

In the present embodiment, whether or not a first range point is in the vicinity of a second range point may be determined based on whether or not the first range point is within a ball having a radius r and centered at the second range point. It will be understood that, as used herein, the terms "first" and "second" are merely used to denote two different range points.

$$B_r^3(p) \subset R^3$$

$$NH_r(i,j,k) := B_r^3(p(i,j,k)) \cap \{p(i',j',k')\}_{i'=i,j'=j,k'=k} = \{p(i',j',k') \| \|p(i',j',k')-p(i,j,k)\| < r, ^\forall (i',j',k') \neq (i,j,k)\} \quad (1)$$

where p is the center of a ball $B^3$ that is an inner region of a three-dimensional sphere having a radius r, and $NH_r$ represents a set of neighbor points within the ball $B^3$.

To simplify the processing, horizontal neighborhoods where it is determined whether or not two range points in the same line i are proximate to each other or vertical neighborhoods where it is determined whether or not two range points in the same direction 3 are proximate to each other may be employed.

$$HNH_r^i(i,j,k) := NH_r(i,j,k) \cap \{p(i',j',k')\}_{i'=I,j'=j,k'=k} = \{p(I',j',k') \| \|p(I',j',k')-p(i,j,k)\| < r, ^\forall (j',k') \neq (j,k)\}$$

$$VNH_r^j(i,j,k) := NH_r(i,j,k) \cap \{p(i',j',k')\}_{i'=i,j'=J,k'=k} = \{p(i',J,k') \| \|p(i',J,k')-p(i,j,k)\| < r, ^\forall (i',k') \neq (i,k)\} \quad (2)$$

where HNH represents a horizontal neighborhood and VNH represents a vertical neighborhood.

Subsequently, in step S220, it is determined whether or not there are range points. If the laser light is reflected by an object, y takes a value less than an upper limit Dmax. If the laser light is not reflected by any object, y takes a value equal to the upper limit. That is, if y1<Dmax and y2<Dmax, then it is determined that there are two range points.

If in step 220 it is determined that there are not such two range points, then in step S230 an evaluation value (index$_1$) for these two points is set to −3.

Figure 6:
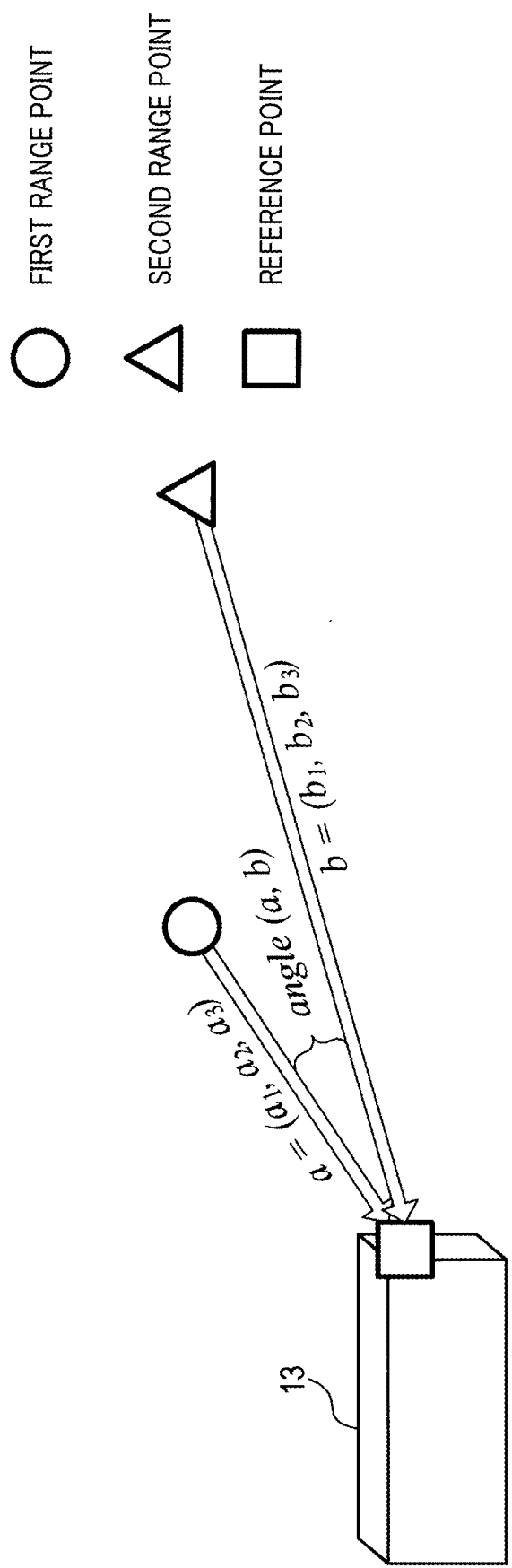
FIG. 6 is a bird's-eye view illustrating a way to calculate an angle between two range points.

If in step 220 it is determined that there are such two range points, then in step S240 an angle between the two selected points is evaluated. In step 240, as shown in FIG. 6, an angle between a line passing through the optics unit 13 (light receiver 15) as the reference point and one of the two range points and a line passing through the optics unit 13 (light receiver 15) as the reference point and the other of the two range points is calculated. Specifically, an angle(a, b) given by the following equation (3) is calculated, where a represents one of the two range points and b represents the other of the two range points.

$$a = (a_1, a_2, a_3), b = (b_1, b_2, b_3) \quad (3)$$

$$\text{angle}(a, b) = \arccos\left(\frac{a \cdot b}{\|a\|\|b\|}\right) = \arccos\left(\frac{a_1 \cdot b_1 + a_2 \cdot b_2 + a_3 \cdot b_3}{\sqrt{a_1^2 + a_2^2 + a_3^2}\sqrt{b_1^2 + b_2^2 + b_3^2}}\right)$$

If in step S240 the angle is greater than a predetermined threshold δ, then in step S250 the evaluation value (index$_1$) of each of the selected two range points is set to −1 as these range points are less likely to be noise points. If in step S240 the angle is equal to or less than the predetermined threshold δ, then in step S260 the evaluation value (index$_1$) of each of the selected two range points is set to +1 as these range points are likely to be noise points.

Figure 7:
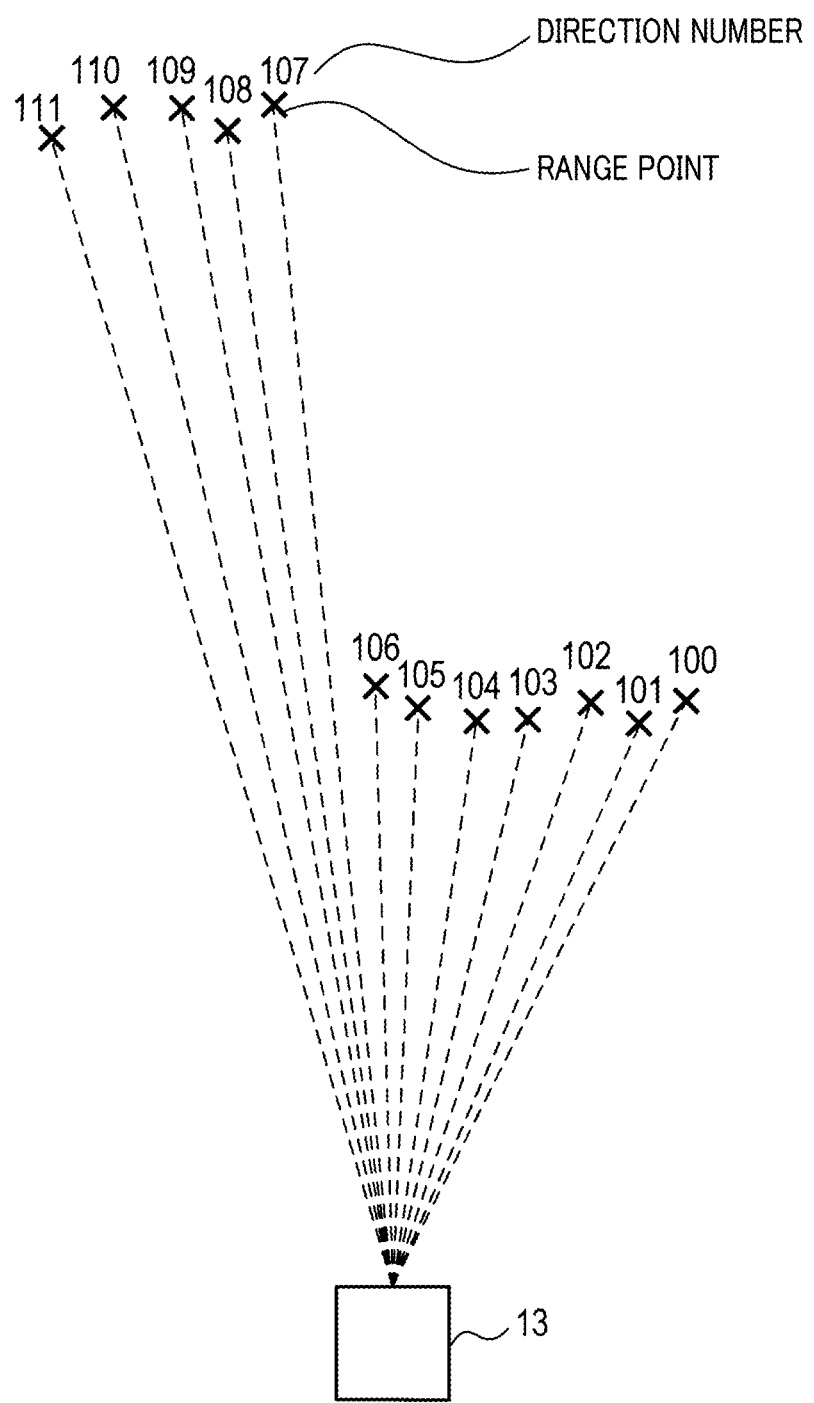
FIG. 7 is a bird's-eye view of a distribution of range points in the absence of a range point that is likely to be a noise point.
Figure 8A:
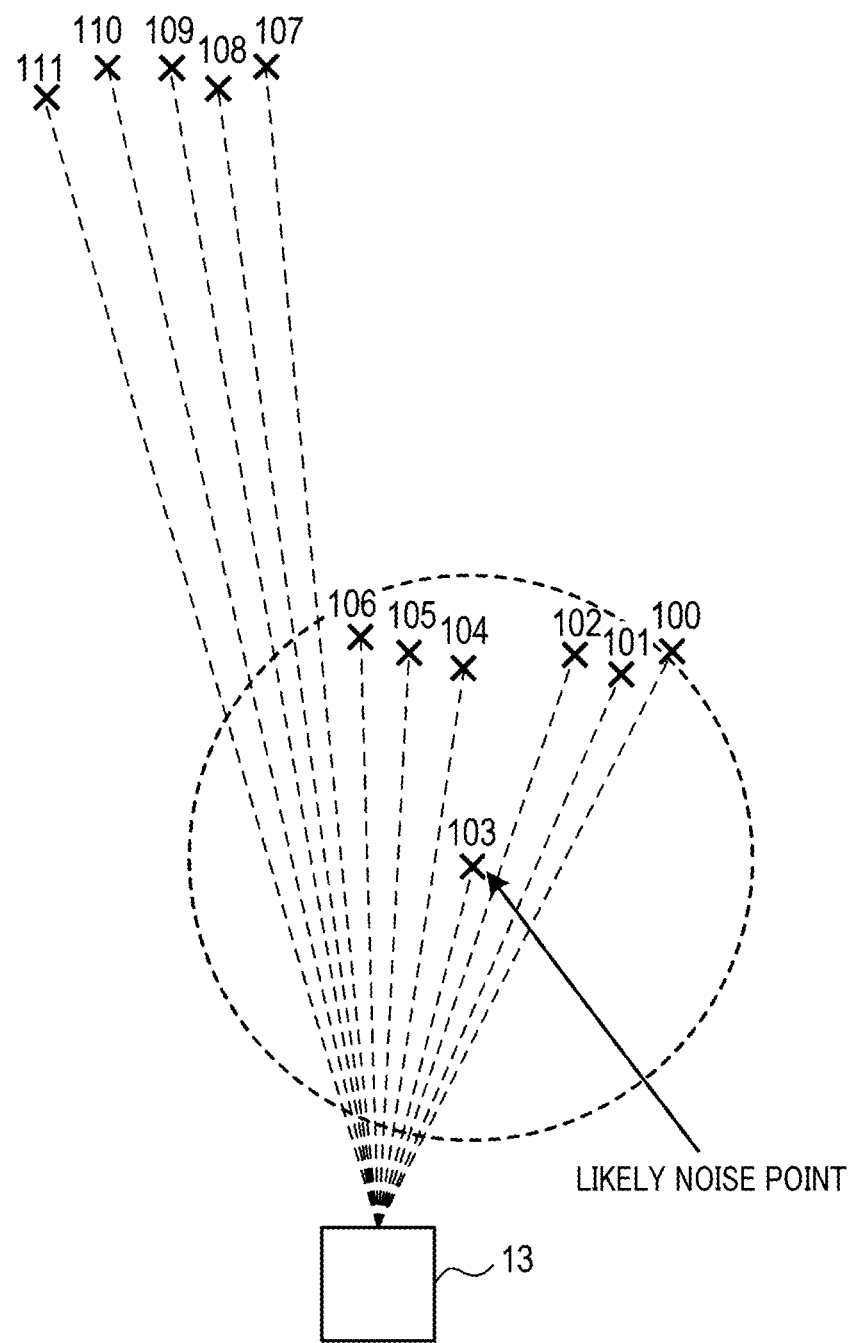
FIG. 8A is a bird's-eye view of a distribution of range points in the presence of a range point that is likely to be a noise point.
Figure 8B:
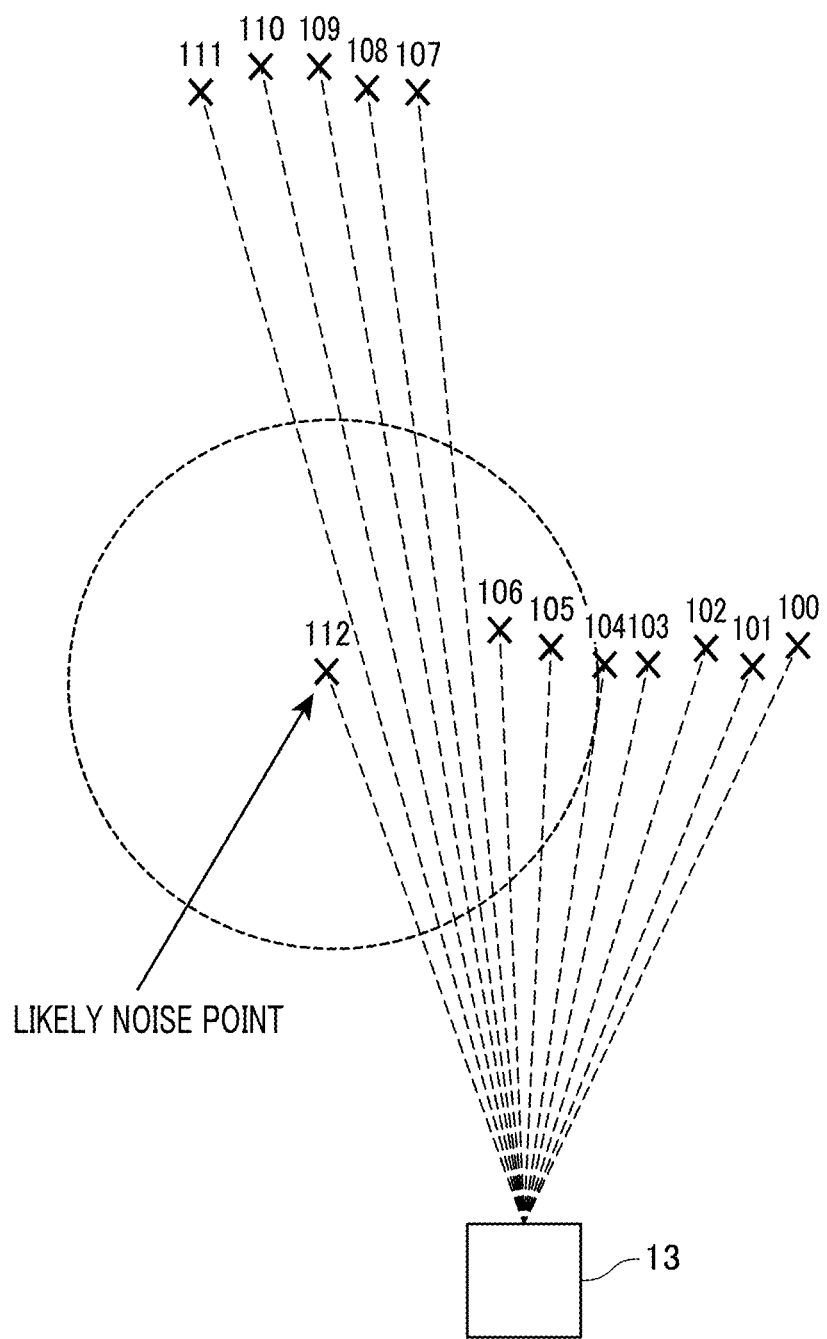
FIG. 8B is a bird's-eye view of a distribution of range points in the presence of a range point that is likely to be a noise point.

After the above processing has been performed for all pairs of range points, the co-linearity rule based evaluation processing ends. Subsequently, returning to FIG. 4, horizontal scattering rule based evaluation processing is performed in step S130. In the presence of a plurality of non-noise range points, as shown in FIG. 7, distances to two adjacent range points (assigned neighboring direction numbers) are substantially equal to each other. However, in the presence of a noise point, as shown in FIGS. 8A and 8B, a distance to the noise point will be quite different from distances to its adjacent range points.

Commonly, in the horizontal scattering rule based evaluation processing and the vertical scattering rule based evaluation processing, the distance changes continuously between range points in adjacent irradiation areas. If the distance changes discontinuously between range points in adjacent irradiation areas, at least one of the range points is likely to be a noise point as shown in FIG. 8A for direction number 103 and FIG. 8B for direction number 112. Such a feature is utilized in the horizontal scattering rule or vertical scattering rule based evaluation processing.

Particularly, in the horizontal scattering rule based evaluation processing, the evaluation is made along the horizontal direction. Also, for each line number i (1≤i≤8), the horizontal scattering rule based evaluation processing is performed for each combination of the direction number j (1≤j≤401) and the echo number k (1≤k≤3).

In the horizontal scattering rule based evaluation processing, a horizontal scattering value lu$_x$(i, j, k) and other various values for each range point p(i, j, k) are defined as follows.

$$NH(i, j, k) := HNH_R^i(i, j, k) \quad (4)$$

-continued $$N(i, j, k) := |NH(i, j, k)|$$

$$D(i, j, k) :=$$
$$\{\|p(i, j', k') - p(i, j, k)\| | p(i, j', k') \in NH(i, j, k)], \forall j', \forall k'\} \subset \mathbb{R}$$

$$Ord(X) := \{1, 2, \ldots, |X|\}, \forall X \subset \mathbb{R}$$

$$DO(i, j, k; l) := Ord(D(i, j, k))(l)$$

$$BD(i, j, k; l) := |j'(l) - j|$$

$$\text{sign}(x) := \begin{cases} 1; & 0 \leq x \\ 0; & x < 0 \end{cases}$$

where character strings appearing in Eq. (4) are defined as follows:

NH(i, j, k): a set of radius R neighbor points around a range point p(i, j, k) in the same line (not including the center point);

N(i, j, k): the total number of elements of the set NH(i, j, k);

D(i, j, k): a set of distance values between the range point p(i, j, k) and the respective elements of NH(i, j, k);

Ord(X): an ascending sort number set of a finite subset X of real numbers;

DO(i, j, k; l): "distance order", an ascending sort number of the l-th element of D(i, j, k);

BD(i, j, k; l): "directional difference", a direction number difference between the l-th range point p(i, j'(l), k'(l)) of D(i, j, k) and the range point p(i, j, k);

MSEh: a noise determination threshold (>0), the noise determination becomes difficult to make as the noise determination threshold is lowered;

$lu_x(i, j, k)$: a horizontal scattering value at the range point p(i, j, k), the range point p(i, j, k) becomes more likely to be a noise point as the value of |DO(i, j, k; l)−BD(i, j, k; l)| increases.

Figure 9:
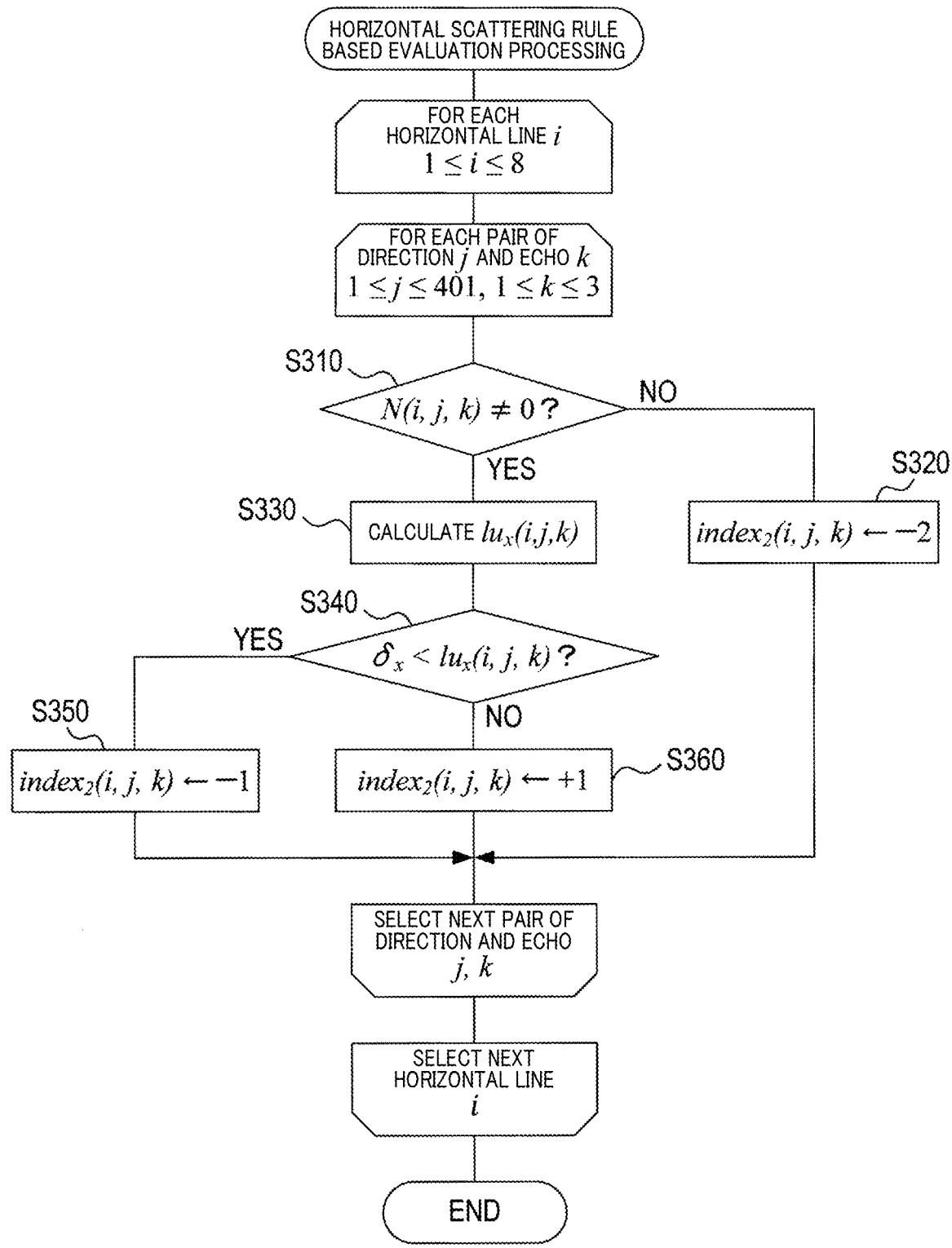
FIG. 9 is a flowchart of horizontal scattering rule based evaluation processing.

In the horizontal scattering rule based evaluation processing, as shown in FIG. 9, it is determined in step S310 whether or not there is another neighbor range point of the selected range point. That is, if N(i, j, k)≠0, then it is determined that there is another neighbor range point of the selected range point. If N(i, j, k)=0, there is no other neighbor range point. In the present embodiment, using the horizontal neighbor set as shown in Eq. (2), it is determined whether or not there is another neighbor range point of the selected range point.

If in step S310 it is determined that there is no other neighbor range point, then the evaluation value (index$_2$) of the selected range point is set to −2. Since a range point whose evaluation value (index$_2$) of −2 is likely to be an isolated point in a frame, the horizontal scattering rule based evaluation processing is not performed for such a range point. Instead, evaluation will be made in chronological evaluation processing described later. The range point with the evaluation value of −2 is referred to as a frame isolated point.

If in step S310 it is determined that there is another neighbor range point, then in step S330 the horizontal scattering value $lu_x(i, j, k)$ is calculated. The horizontal scattering value is calculated according to the following equation.

$$lu_x(i, j, k) := \frac{\sum_{l=1}^{N(i,j,k)} \text{sign}(MSE_h - |DO(i, j, k; l) - BD(i, j, k; l)|)}{N(i, j, k)} \quad (5)$$

Subsequently, in step S340, the horizontal scattering value is compared with a predetermined threshold δx. If in step S340 it is determined that the horizontal scattering value $lu_x$ is greater than the threshold δx, then in step S350 the evaluation value (index$_2$) is set to −1 as the selected range point is less likely to be a noise point. If in step S340 it is determined that the horizontal scattering value $lu_x$ is equal to or less than the threshold δx, then in step S360 the evaluation value (index$_2$) is set to +1 as the selected range point is likely to be a noise point.

After the above processing has been performed for all combinations of numbers i, j, k, the horizontal scattering rule based evaluation processing ends.

To reduce a processing load in the above horizontal scattering rule based evaluation processing, a region of interest (ROI) may be set to perform noise determination therein and the evaluation processing may be performed only within the ROI.

$$ROI := [x_{min}, x_{max}] \times [y_{min}, y_{max}] \times [z_{min}, z_{max}] \subset \mathbb{R}^3 \quad (6)$$

Alternatively, the radius R may be varied as a function of the distance to the range point (i.e., the distance value y). For example, the radius R may be increased when the range point is located at a large distance from the subject vehicle.

$$R(y) = \begin{cases} r_1; & 0 \leq y \leq dc_{max}^1 \\ r_2; & dc_{max}^1 < y \end{cases}, r_1 < r_2 \quad (7)$$

Subsequently, referring back to FIG. 4, the vertical scattering rule based evaluation processing is performed in step S140. In the horizontal scattering rule based evaluation processing, various values, such as a vertical scattering value $lu_y(i, j, k)$ and the like for each range point p(i, j, k), are defined as follows.

$$NH(i,j,k) := VNH_R^j(i,j,k)$$

$$N(i,j,k) := |NH(i,j,k)|$$

$$D(i,j,k) := \{\|p(i',j,k') - p(i,j,k)\| | p(i',j,k') \in NH(i,j,k) \forall i', \forall k'\} \subset \mathbb{R}$$

$$DO(i,j,k;l) := Ord(D(i,j,k))(l)$$

$$BD(i,j,k;l) := |i'(l) - i| \quad (8)$$

where character strings appearing in Eq. (8) are defined as follows:

NH(i, j, k): a set of radius R neighbor points around a range point p(i, j, k) in the same direction (not including the center point);

N(i, j, k): the total number of elements of the set NH(i, j, k);

D(i, j, k): a set of distance values between the range point p(i, j, k) and the respective elements of NH(i, j, k);

DO(i, j, k; l): "distance order", an ascending sort number of the l-th element of D(i, j, k);

BD(i, j, k; l): "directional difference", a line number difference between the l-th range point p(i'(l), j, k'(l)) of D(i, j, k) and the range point p(i, j, k);

MSEv: a noise determination threshold (>0), the noise determination becomes difficult to make as the noise determination threshold is lowered;

$lu_y(i, j, k)$: a vertical scattering value at the range point p(i, j, k).

Thus, the noise determination can be performed in a similar manner to that of the horizontal scattering rule based evaluation processing, where the evaluation value is recorded as index$_3$ and the vertical scattering value lu$_y$(i, j, k) is calculated using the following equation.

$$lu_y(i, j, k) := \frac{\sum_{l=1}^{N(i,j,k)} \text{sign}(MSE_v - |DO(i, j, k; l) - BD(i, j, k; l)|)}{N(i, j, k)} \quad (9)$$

If the vertical resolution is lower than the horizontal resolution, the vertical scattering value lu$_y$(i, j, k) may be calculated using only the range points in the line immediately above and the line immediately below, particularly, closest ones of the range points in the line immediately above and the line immediately below.

$$NH(i, j, k) := HNH_R^{i-1}(i, j, k) \cup HNH_R^{i+1}(i, j, k) \quad (10)$$

$$N(i, j, k) := |NH(i, j, k)|$$

$$(j^-, k^-) := \underset{p(i-1,j',k') \in NH(i,j,k)}{\text{argmin}} \|p(i-1, j', k') - p(i, j, k)\|,$$

$$p^-(i, j, k) := p(i-1, j^-, k^-)$$

$$(j^+, k^+) := \underset{p(i+1,j',k') \in NH(i,j,k)}{\text{argmin}} \|p(i+1, j', k') - p(i, j, k)\|,$$

$$p^+(i, j, k) := p(i+1, j^+, k^+)$$

$$DO^-(i, j, k) :=$$
$$\begin{cases} 1; & \|p^-(i, j, k) - p(i, j, k)\| < \|p^+(i, j, k) - p(i, j, k)\| \\ 2; & \text{otherwise} \end{cases}$$

$$DO^+(i, j, k) :=$$
$$\begin{cases} 1; & \|p^+(i, j, k) - p(i, j, k)\| < \|p^-(i, j, k) - p(i, j, k)\| \\ 2; & \text{otherwise} \end{cases}$$

$$BD^-(i, j, k) := |j^- - j|,$$

$$BD^+(i, j, k) := |j^+ - j|$$

where symbols appearing in Eq. (10) are defined as follows:
NH(i, j, k): a set of radius R neighbor points around a range point p(i, j, k) in the line immediately above and the line immediately below (not including the center point);
p$^-$(i, j, k): the closest point in the line immediately above the range point p(i, j, k);
p$^+$(i, j, k): the closest point in the line immediately below the range point p(i, j, k);
DO$^-$(i, j, k;l): a distance order immediately above the range point p(i, j, k);
DO$^+$(i, j, k;l): a distance order immediately below the range point p(i, j, k);
BD$^-$(i, j, k; l): a direction difference immediately above the range point p(i, j, k);
BD$^+$(i, j, k; l): a direction difference immediately below the range point p(i, j, k)

Figure 10:
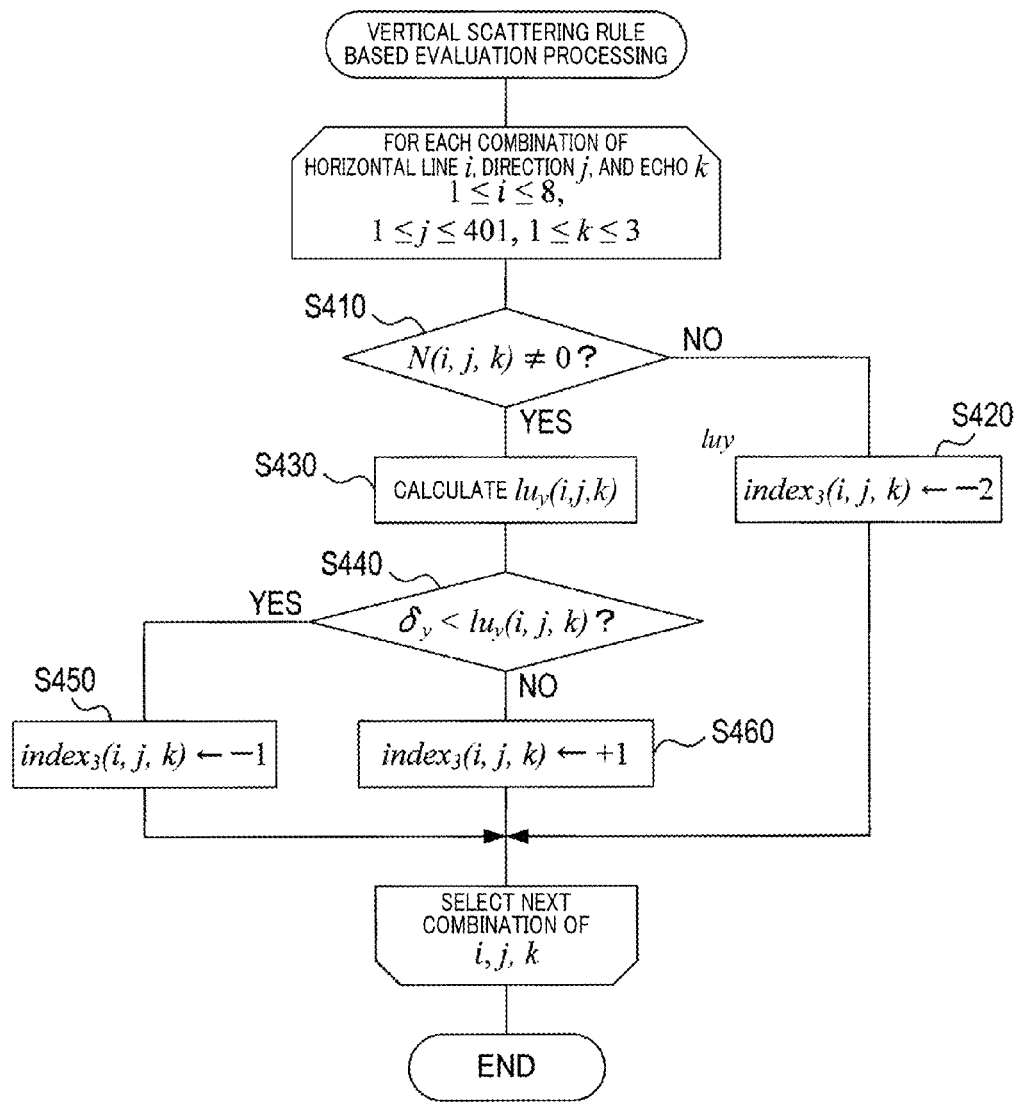
FIG. 10 is a flowchart of vertical scattering rule based evaluation processing.

FIG. 10 shows an example of the vertical scattering rule based evaluation processing. In the vertical scattering rule based evaluation processing, as shown in FIG. 10, using the set of vertical neighbor range points defined in the equation (2), it is determined in step S410 whether or not there is another neighbor range point. That is, if N(i, j, k)≠0, then it is determined that there is another neighbor range point. If N(i, j, k)=0, there is no other range point.

If in step S410 it is determined that there is no other neighbor range point, then the evaluation value (index$_3$) of the selected range point is set to −2. If in step S410 it is determined that there is another neighbor range point, then in step S430 the vertical scattering value lu$_y$(i, j, k) is calculated.

$$lu_y(i, j, k) = \text{sign}(MSE_v - |DO(i, j, k) - BD(i, j, k)|) + \quad (11)$$
$$\text{sign}(MSE_v - |DO(i, j, k) - BD(i, j, k)|)$$

Subsequently, in step S440, the vertical scattering value and the predetermined threshold δy are compared. If in step S440 it is determined the vertical scattering value lu$_y$ is greater than the threshold δy, then in step S450 the evaluation value (index$_3$) is set to −1 as the range point is less likely to be a noise point. If in step S440 it is determined the vertical scattering value lu$_y$ is equal to or less than the threshold δy, then in step S460 the evaluation value (index$_3$) is set to +1 as the range point is likely to be a noise point.

After the above processing has been performed for all combinations of numbers i, j, k, the vertical scattering rule based evaluation processing ends. As in the horizontal scattering rule based evaluation processing, also in the vertical scattering rule based evaluation processing, to reduce a processing load, a region of interest (ROI) may be set to make noise determination therein and the evaluation processing may be performed only within the ROI.

After the above processing has been performed for all combinations of numbers i, j, k, the vertical scattering rule based evaluation processing ends. Subsequently, referring back to FIG. 4, final decision processing is performed in step S150. In the final decision processing, using the evaluation values (index$_1$, index$_2$, index$_3$) for each range point, it is evaluated whether or not the range point is a noise point, and a range point evaluated as a noise point is removed. The final decision processing is also performed for each combination of the line number i (1≤i≤8), the direction number j (1≤j≤401), and the echo number k (1≤k≤3).

Figure 11:
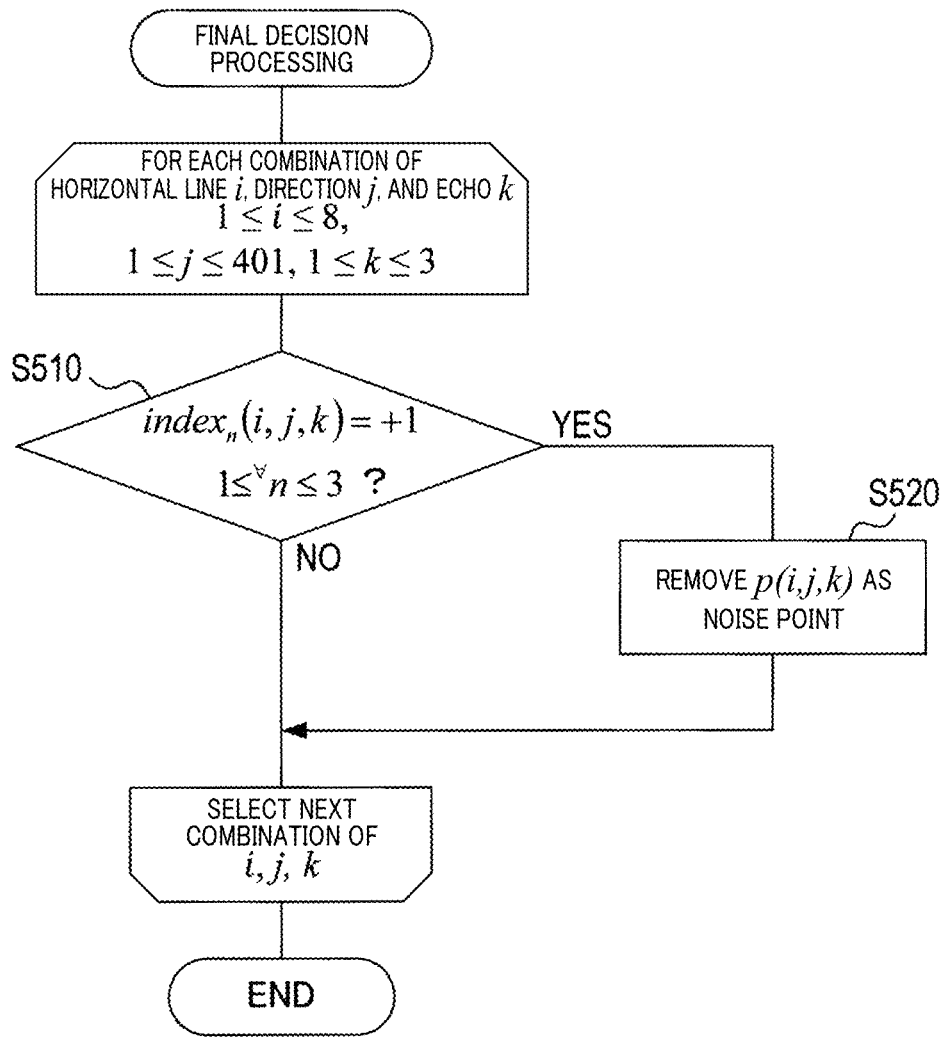
FIG. 11 is a flowchart of final decision processing.

Specifically, as shown in FIG. 11, for each range point, it is determined in step S510 whether or not all the evaluation values have been evaluated to be +1. A range point for which it is determined that all the three evaluation values are evaluated to be +1 in step S520 is removed in step S520. Thereafter, the final decision processing ends. If in step S510 it is determined that at least one of the three evaluation values is evaluated to other than +1, then the final decision processing ends immediately.

After the above processing has been performed for all combinations of numbers i, j, k, referring back to FIG. 4, chronological evaluation processing is performed in step S160. In the chronological evaluation processing, using the range point cloud data acquired in the previous cycles (or previous frames), whether or not a range point acquired in the current cycle is a noise point is estimated based on whether or not the range point acquired in the current cycle has been detected previously.

Figure 12:
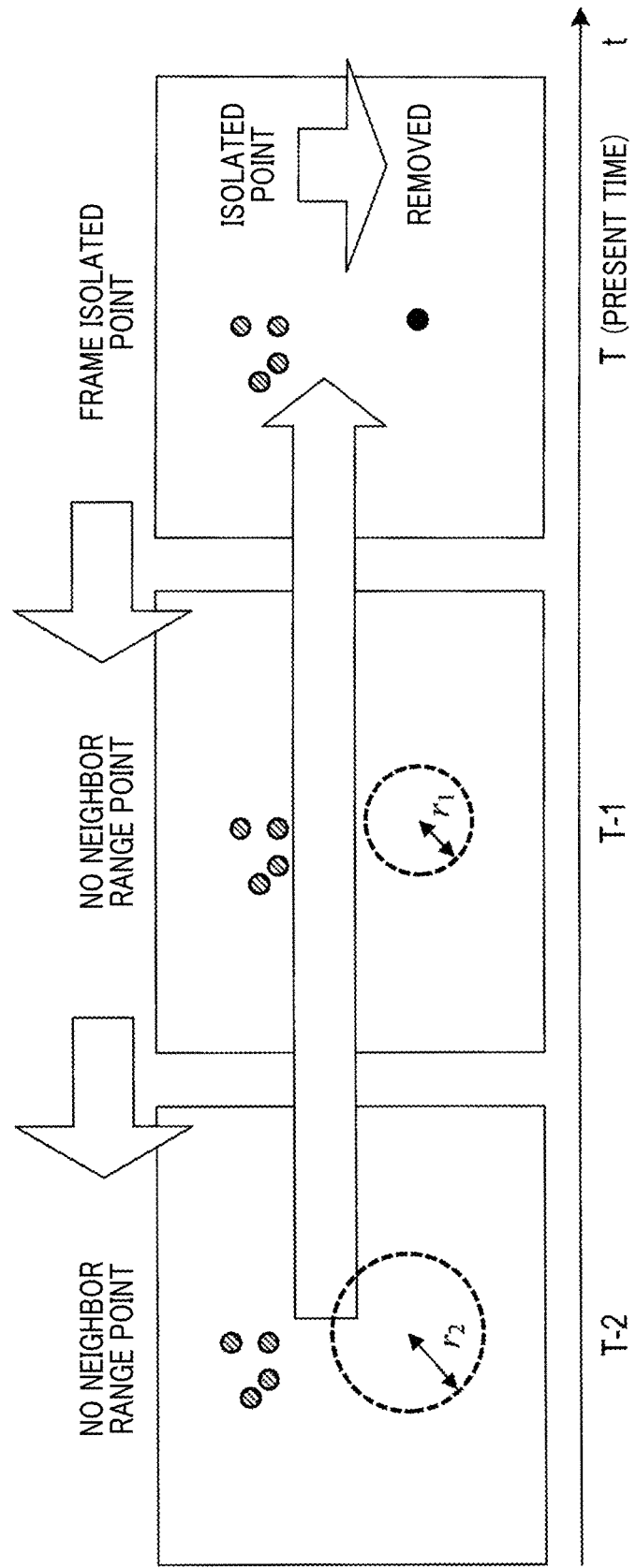
FIG. 12 is a schematic of chronological evaluation processing.

Specifically, as shown in FIG. 12, for a current frame isolated point (with index=−2), it is determined whether or not there is a neighbor point in the most recent two frames. If it is determined that there is no neighbor point, the current frame isolated point is determined to be a noise point.

Figure 13:
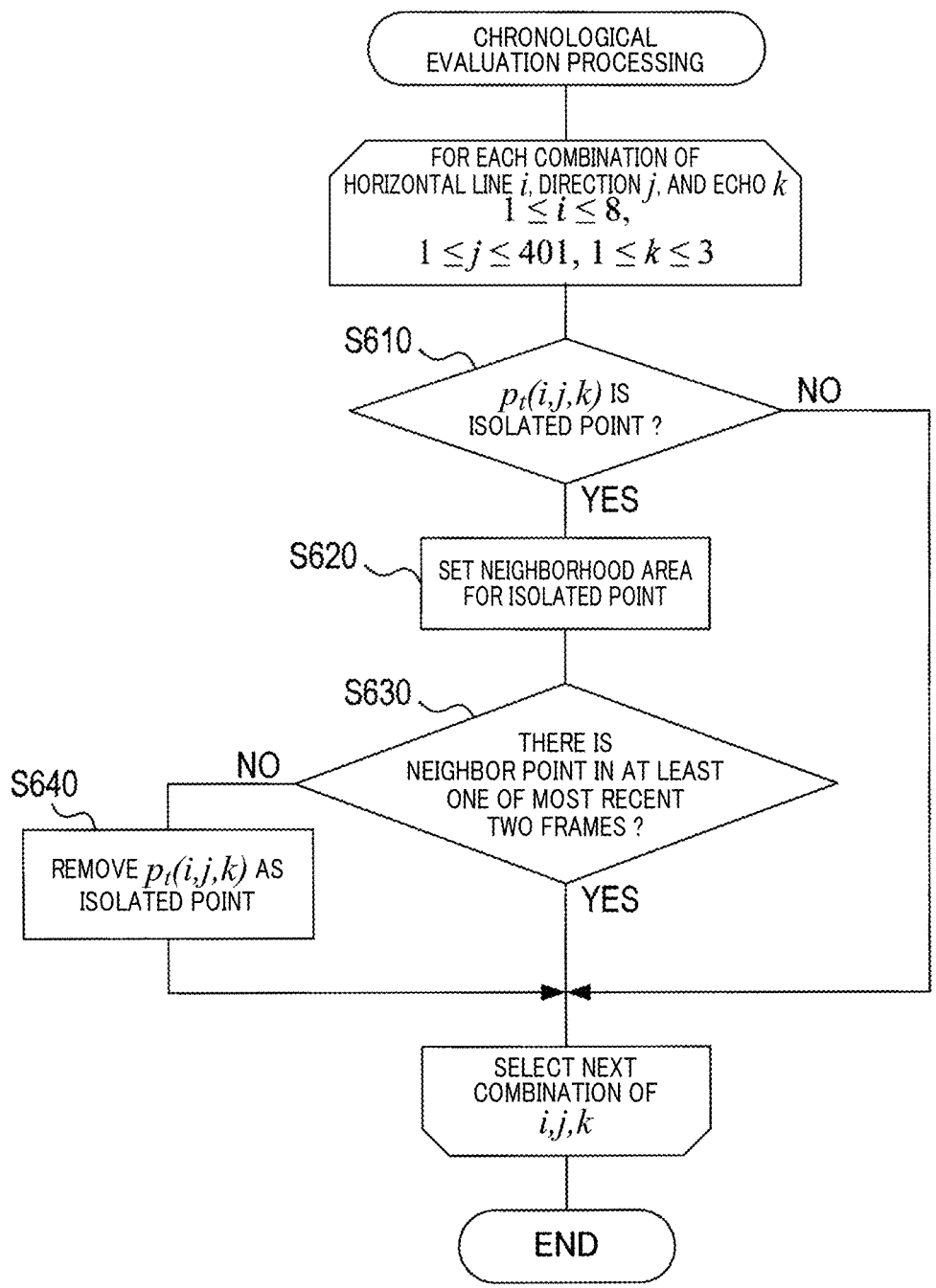
FIG. 13 is a flowchart of chronological evaluation processing.

The chronological evaluation processing is also performed for each combination of the line number i (1≤i≤8), the direction number j (1≤j≤401), and the echo number k ($1 \le k \le 3$). In the chronological evaluation processing, as shown in FIG. 13, it is determined in step S610 whether or not the selected range point is a frame isolated point.

That is, if the following condition is met, it is determined that the selected range point is a frame isolated point.

$$\begin{cases} index_2(i, j, k) = -2 \\ \vee \\ index_3(i, j, k) = -2 \end{cases} \quad (12)$$

If in step S610 it is determined that the selected range point is not a frame isolated point, then the chronological evaluation processing ends. If in step S610 it is determined that the selected range point is a frame isolated point, a neighborhood area for the isolated point is set in step S620. In the chronological evaluation processing, the radius of the neighborhood area with fixed center coordinates pt(i, j, k) may be changed as a function of a traveling speed v of the subject vehicle as follows.

$$\begin{cases} cp_1 = cp_2 = p_t(i, j, k) \\ r_1 = r_0 \cdot (\Delta t \cdot v) \\ r_2 = r_0 \cdot (2\Delta t \cdot v) \end{cases} \quad (13)$$

Alternatively, the center coordinates pt(i, j, k) of the neighborhood area with a fixed radius may be changed as a function of the traveling speed v of the subject vehicle as follows, where the fixed radius is denoted by r0.

$$\begin{cases} cp_1 = p_t(i, j, k) - \Delta t \cdot v \\ cp_2 = p_t(i, j, k) - 2\Delta t \cdot v \\ r_1 = r_2 = r_0 \end{cases} \quad (14)$$

Subsequently, in step S630, it is determined whether or not there is a neighbor point in at least one of the most recent two frames. For example, if the following condition is met, it is determined that there is no neighbor point in both of the most recent two frames.

$$\begin{cases} B^3_{r_1}(cp_1) \cap \{p_{t-1}(i, j, k)\}_{i,j,k} = \phi \\ \wedge \\ B^3_{r_2}(cp_2) \cap \{p_{t-2}(i, j, k)\}_{i,j,k} = \phi \end{cases} \quad (15)$$

If in step S630 it is determined that there is no neighbor point in each of the most recent two frames, then in step S640 the selected range point is removed as an isolated point. Then the chronological evaluation processing ends.

If in step S630 it is determined that there is a neighbor point in at least one of the most recent two frames, then the chronological evaluation processing ends immediately.

After the chronological evaluation processing is completed, referring back to FIG. 4, object recognition processing is performed in step S170. In the object recognition processing, the range points are clustered. Types and sizes of the objects may be recognized by pattern matching, where shapes of the clustered range points are compared with prepared models. Alternatively, the object recognition processing may be implemented by a well-known technique other than the above technique.

After such processing is completed, the object recognition ends.

Advantages

Figure 1B:
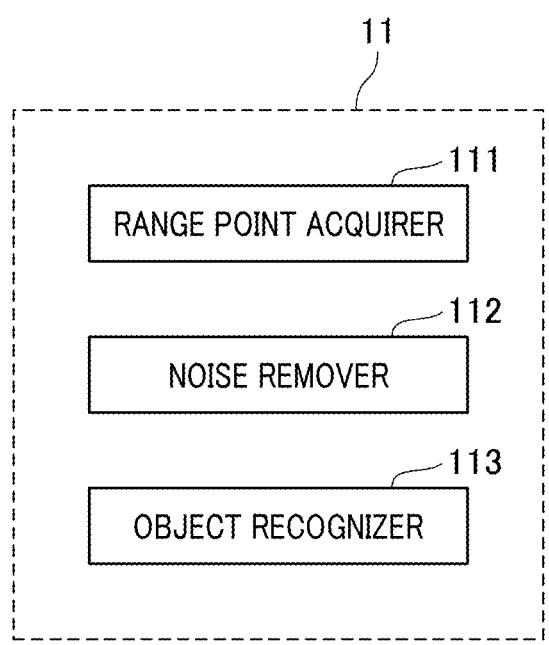
FIG. 1B is a functional block diagram of a radar controller of the driving assistance system.

In the driving assistance system 1 described as above, the radar controller 11 (as an object recognition apparatus that is also an data processing apparatus for processing range point data), as shown in FIG. 1B, includes a range point acquirer 111 configured to irradiate each of irradiation areas arranged in a horizontally and vertically extending grid and forming a detection area for detecting a target with laser light and receive the reflected light from the respective irradiation areas, thereby acquiring a plurality of range points representing per-irradiation area coordinates of the target. The radar controller 11 further includes a noise remover 112 configured to, based on either or both of degrees of angle proximity (or angular proximity) and degrees of distance proximity between a plurality of subject range points to be determined whether to be a noise point, of the plurality of range points, as viewed from a reference point, determine whether or not each of the subject range points is a noise point, and remove the noise points from the plurality of range points.

With the driving assistance system 1 configured as above, a noise point can be determined based on features of the noise point characterized in angular difference and/or distance difference between the subject range points as viewed from a reference point. This allows the noise point to be removed accurately.

Figure 14A:
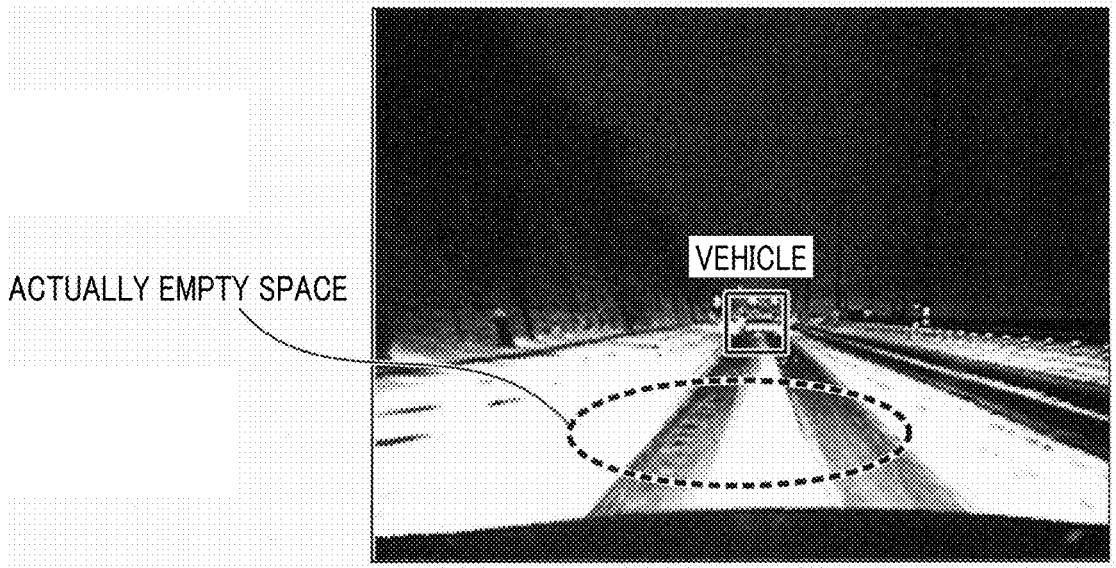
FIGS. 14A-14C are diagrams illustrating effects of the embodiment.
Figure 14B:
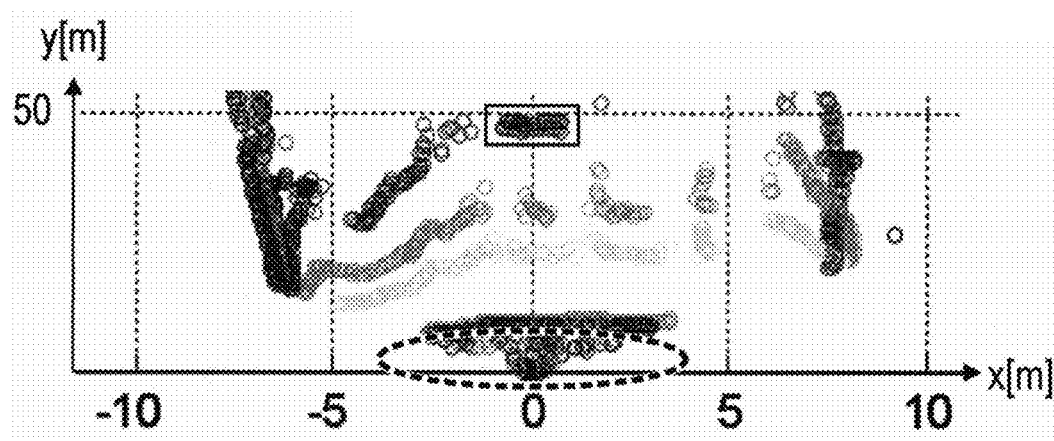
Figure 14C:
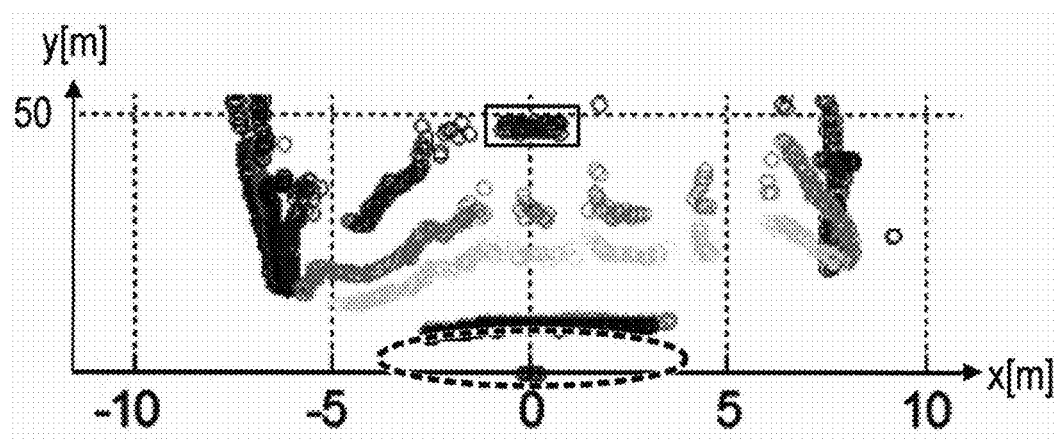

Particularly, the radar device 10 mounted in a vehicle traveling in snow as shown in FIG. 14A is prone to incorrectly detect snowfall in close proximity to the subject vehicle as noise points, as shown in FIG. 14B (see the area marked with a broken line). As can be seen from FIG. 14C, the noise removal method of the present embodiment can remove the snowfall as noise points (see the area marked with a broken line).

In the driving assistance system 1 configured as above, the noise remover 112 of the radar controller 11 is configured to calculate the co-linearity indicative of a degree of proximity of a first one of the plurality of subject range points to a line passing through a second one of the subject range points and the reference point, and if the co-linearity is equal to or greater than a predetermined value, then determine whether or not each of the subject range points is likely to be a noise point.

With this configuration of the driving assistance system 1, the degree of angle proximity between the subject range points is determined using the co-linearity, which allows a noise point to be determined using a feature of the noise point characterized in the co-linearity.

In the driving assistance system 1 configured as above, the noise remover 112 of the radar controller 11 is configured to calculate angles between lines passing through the reference point and the respective subject range points, and determine that the co-linearity becomes higher as the angle decreases.

The degrees of angle proximity between the subject range points as viewed from the reference point are acquired by calculating the angles between lines passing through the reference point and the respective subject range points. With this configuration of the driving assistance system 1, the degrees of angle proximity between the subject range points are allowed to be calculated by simple processing.

In the driving assistance system 1 configured as above, the noise remover 112 of the radar controller 11 is configured to, based on a continuity in distance between range points in adjacent irradiation areas, of the plurality of subject range points, determine whether or not each of the subject range points is likely to be a noise point.

A feature is utilized that the distance changes continuously between range points in adjacent irradiation areas, and if the distance changes discontinuously between range points in adjacent irradiation areas, at least one of the range points is likely to be a noise point. With this configuration of the driving assistance system 1, a noise point can be removed more accurately.

In the driving assistance system 1 configured as above, the noise remover 112 of the radar controller 11 is configured to, based on a horizontal continuity in distance between range points in horizontally adjacent irradiation areas, of the plurality of subject range points, determine whether or not each of the subject range points is likely to be a noise point. With this configuration of the driving assistance system 1, the horizontal continuity in distance can be determined.

In the driving assistance system 1 configured as above, the noise remover 112 of the radar controller 11 is configured to, based on a continuity in distance between range points in horizontally adjacent irradiation areas, of the plurality of subject range points, determine whether or not each of the subject range points is likely to be a noise point. With this configuration of the driving assistance system 1, the continuity in distance between horizontally adjacent range points can be determined.

In the driving assistance system 1 configured as above, the noise remover 112 of the radar controller 11 is configured to, based on a vertical continuity in distance between range points in vertically adjacent irradiation areas, of the plurality of subject range points, determine whether or not each of the subject range points is likely to be a noise point. With this configuration of the driving assistance system 1, the vertical continuity in distance can be determined.

In the driving assistance system 1 configured as above, the noise remover 112 of the radar controller 11 is configured to, based on a continuity in distance between range points in vertically adjacent irradiation areas, of the plurality of subject range points, determine whether or not each of the subject range points is likely to be a noise point. With this configuration of the driving assistance system 1, use of the continuity in distance between vertically adjacent range points allows the continuity in distance between nearer range points.

In the driving assistance system 1 configured as above, the noise remover 112 of the radar controller 11 is configured to determine whether or not there is a range point acquired in the past within a predetermined reference distance from a subject range point to be determined whether to be a noise point, and if there is no range point acquired in the past within the reference distance from the subject range point, then determine that the subject range point is likely to be a noise point.

With this configuration of the driving assistance system 1, a range point that has suddenly appeared can be determined to be a noise point.

In the driving assistance system 1 configured as above, the noise remover 112 of the radar controller 11 is configured to calculate an evaluation value indicative of a likelihood that a range point is a noise point, and if the evaluation value of the range point is equal to or greater than a threshold, then remove the range point as a noise point.

With this configuration of the driving assistance system 1, a noise point can be removed by comparing the evaluation value and the threshold.

In the driving assistance system 1 configured as above, the object recognizer 113 of the radar controller 11 is configured to use the plurality of range points other than the noise points to recognize an object.

With the driving assistance system 1 configured as above, noise can be well removed. Thus, an object can be well recognized.

Functions of the range point acquirer 111, the noise remover 112, and the object recognizer 113 may be implemented by the CPU 18 executing the computer programs stored in the memory 19 (see FIG. 1A). Referring again to FIG. 4, the range point acquirer 111 may be responsible for executing step S110, the noise remover 112 may be responsible for executing steps S120-S160, and the object recognizer 113 may be responsible for executing step S170.

Other Embodiments

The functions of a single component may be distributed to a plurality of components, or the functions of a plurality of components may be integrated into a single component. At least part of the configuration of the above embodiments may be replaced with a known configuration having a similar function. At least part of the configuration of the above embodiments may be removed. At least part of the configuration of one of the above embodiments may be replaced with or added to the configuration of another one of the above embodiments. While only certain features of the invention have been illustrated and described herein, many modifications and changes will occur to those skilled in the art. It is, therefore, to be understood that the appended claims are intended to cover all such modifications and changes as falling within the true spirit of the invention.

It should be appreciated that the invention is not to be limited to the driving assistance system 1 disclosed above and that the present invention can be implemented in numerous ways, including as a control apparatus that includes the driving assistance system 1 as a component, a program for enabling a computer to function as the driving assistance system 1, a non-transitory computer readable storage medium storing such a program, a driving assistance method and the like.

In the above embodiments, the chronological evaluation processing is performed by range point basis. Alternatively, for example, the chronological evaluation processing may be performed by cluster basis or on a cluster basis. That is, in the above driving assistance system 1, the noise remover 112 of the radar controller 11 may be configured to determine whether or not there is a cluster of range points acquired in the past within a reference distance from a subject cluster of range points to be determined whether or not to be a noise point, and if there is no cluster of range points acquired in the past within the reference distance from the subject cluster, then determine the subject cluster of range points is likely to be a noise point.

In such an embodiment, clustering may be performed before the chronological evaluation processing is performed. Then it may be determined by cluster basis that there is a neighbor cluster in the previous frames. With this configuration of the driving assistance system, a noise point can be determined by cluster basis.

In the above driving assistance system 1, the noise remover 112 of the radar controller 11 may be configured to calculate single or plural evaluation values, and remove a subject range point to be determined whether to be a noise point, for which a weighted sum of the single or plural evaluation values is equal to or greater than a threshold as a noise point. In such an embodiment, for example, the final decision processing as shown in FIG. 15 may be performed.

In some other embodiments, instead of a flag value such as index, the angles between lines passing through the reference point and the respective subject range points, horizontal scattering values, vertical scattering values and others may be calculated as the evaluation values in the final decision processing. That is, in the final decision processing, as shown in FIG. 15, a weighted sum of these evaluation values S(i, j, k) may be calculated in step S710.

The weighted sum of the evaluation values may be calculated using the following equation.

$$S(i, j, k) := w_{ANGLE} \min_{i',j',k'} \text{angle}(p(i, j, k), p(i', j', k')) + \\ w_{LUX} lu_x(i, j, k) + w_{LUY} lu_y(i, j, k) \quad (16)$$

where $W_{ANGLE}$, $W_{LUX}$, $W_{LUY}$ are arbitrary coefficients as weighting factors to be determined by experiments.

If in step S710 it is determined that the sum S(i, j, k) is equal to or less than a threshold δs, then in step S720 the range point p(i, j, k) is removed as a noise point. Thereafter, the final decision processing ends. If in step S710 it is determined that the sum S(i, j, k) is greater than the threshold δs, then the final decision processing ends immediately.

With this configuration of the driving assistance system that performs such final decision processing, a noise point is determined using a sum of a plurality of evaluation values, which can lead to more accurate noise determination.

What is claimed is:

1. An object recognition apparatus for recognizing an object as a target, the apparatus comprising:
    a range point acquirer configured to irradiate each of irradiation areas arranged in a horizontally and vertically extending grid and forming a detection area for detecting a target with laser light and receive the reflected light from the respective irradiation areas, thereby acquiring a plurality of range points representing per-irradiation area coordinates of the target;
    a noise remover configured to, based on either or both of degrees of angle proximity and degrees of distance proximity between a plurality of subject range points to be determined whether to be a noise point, of the plurality of range points, as viewed from a reference point, determine whether or not each of the subject range points is a noise point, and remove the noise points from the plurality of range points; and
    an object recognizer configured to use the plurality of range points other than the noise points to recognize the object,
    wherein the noise remover is configured to calculate a co-linearity indicative of a degree of proximity of a first one of the plurality of subject range points to a line passing through a second one of the subject range points and the reference point, and if the co-linearity is equal to or greater than a predetermined value, then determine whether or not each of the subject range points is likely to be a noise point.

2. The apparatus of claim 1, wherein the noise remover is configured to calculate angles between lines passing through the reference point and the respective subject range points, and determine that the co-linearity becomes higher as the angle decreases.

3. The apparatus of claim 1, wherein the noise remover is configured to, based on a continuity in distance between range points in adjacent irradiation areas, of the plurality of subject range points, determine whether or not each of the subject range points is likely to be a noise point.

4. The apparatus of claim 1, wherein the noise remover is configured to, based on a horizontal continuity in distance, determine whether or not each of the subject range points is likely to be a noise point.

5. The apparatus of claim 4, wherein the noise remover is configured to, based on a continuity in distance between range points in horizontally adjacent irradiation areas, of the plurality of subject range points, determine whether or not each of the subject range points is likely to be a noise point.

6. The apparatus of claim 1, wherein the noise remover is configured to, based on a vertical continuity in distance, determine whether or not each of the subject range points is likely to be a noise point.

7. The apparatus of claim 6, wherein the noise remover is configured to, based on a continuity in distance between range points in vertically adjacent irradiation areas, of the plurality of subject range points, determine whether or not each of the subject range points is likely to be a noise point.

8. The apparatus of claim 1, wherein the noise remover is configured to determine whether or not there is a range point acquired in the past within a predetermined reference distance from a subject range point to be determined whether to be a noise point, and if there is no range point acquired in the past within the reference distance from the subject range point, then determine that the subject range point is likely to be a noise point.

9. The apparatus of claim 1, wherein the noise remover is configured to calculate an evaluation value indicative of a likelihood that a range point is a noise point, and if the evaluation value of the range point is equal to or greater than a threshold, then remove the range point, as a noise point.

10. An object recognition apparatus for recognizing an object as a target, the apparatus comprising:
    a range point acquirer configured to irradiate each of irradiation areas arranged in a horizontally and vertically extending grid and forming a detection area for detecting a target with laser light and receive the reflected light from the respective irradiation areas, thereby acquiring a plurality of range points representing per-irradiation area coordinates of the target;
    a noise remover configured to, based on either or both of degrees of angle proximity and degrees of distance proximity between a plurality of subject range points to be determined whether to be a noise point, of the plurality of range points, as viewed from a reference point, determine whether or not each of the subject range points is a noise point, and remove the noise points from the plurality of range points; and
    an object recognizer configured to use the plurality of range points other than the noise points to recognize the object,
    wherein the noise remover is configured to determine whether or not there is a range point acquired in the past within a predetermined reference distance from a subject range point to be determined whether to be a noise point, and if there is no range point acquired in the past within the reference distance from the subject range point, then determine that the subject range point is likely to be a noise point, and
    the noise remover is configured to determine whether or not there is a cluster of range points acquired in the past within a reference distance from a subject cluster of range points to be determined whether to be a noise point, and if there is no cluster of range points acquired in the past within the reference distance from the subject cluster, then determine the subject cluster of range points is likely to be a noise point.

11. An object recognition apparatus for recognizing an object as a target, the apparatus comprising:
a range point acquirer configured to irradiate each of irradiation areas arranged in a horizontally and vertically extending grid and forming a detection area for detecting a target with laser light and receive the reflected light from the respective irradiation areas, thereby acquiring a plurality of range points representing per-irradiation area coordinates of the target;
a noise remover configured to, based on either or both of degrees of angle proximity and degrees of distance proximity between a plurality of subject range points to be determined whether to be a noise point, of the plurality of range points, as viewed from a reference point, determine whether or not each of the subject range points is a noise point, and remove the noise points from the plurality of range points; and
an object recognizer configured to use the plurality of range points other than the noise points to recognize the object,
wherein the noise remover is configured to calculate an evaluation value indicative of a likelihood that a range point is a noise point, and if the evaluation value of the range point is equal to or greater than a threshold, then remove the range point, as a noise point, and
the noise remover is configured to calculate single or plural evaluation values, and remove a subject range point to be determined whether to be a noise point, for which a weighted sum of the single or plural evaluation values is equal to or greater than a threshold, as a noise point.

12. A noise removal method for removing noise points from a plurality of range points, the method comprising steps of:
irradiating each of irradiation areas arranged in a horizontally and vertically extending grid and forming a detection area for detecting a target with laser light and receiving the reflected light from the respective irradiation areas, thereby acquiring a plurality of range points representing per-irradiation area coordinates of the target;
based on either or both of degrees of angle proximity and degrees of distance proximity between a plurality of subject range points to be determined whether to be a noise point, of the plurality of range points, as viewed from a reference point, determining whether or not each of the subject range points is a noise point; and
removing the noise points from the plurality of range points,
wherein the determining step comprising calculating the co-linearity indicative of a degree of proximity of a first one of the plurality of subject range points to a line passing through a second one of the subject range points and the reference point, and if the co-linearity is equal to or greater than a predetermined value, determining whether or not each of the subject range points is likely to be a noise point.

13. The method of claim 12, wherein the determining step comprising calculating angles between lines passing through the reference point and the respective subject range points, and determining that the co-linearity becomes higher as the angle decreases.

14. The method of claim 12, wherein the determining step comprising, based on a continuity in distance between range points in adjacent irradiation areas, of the plurality of subject range points, determining whether or not each of the subject range points is likely to be a noise point.

15. The method of claim 12, wherein the determining step comprising, based on a horizontal continuity in distance, determining whether or not each of the subject range points is likely to be a noise point.

16. The method of claim 15, wherein the determining step comprising, based on a continuity in distance between range points in horizontally adjacent irradiation areas, of the plurality of subject range points, determine whether or not each of the subject range points is likely to be a noise point.

17. The method of claim 12, wherein the determining step comprising, based on a vertical continuity in distance, of the plurality of subject range points, determining whether or not each of the subject range points is likely to be a noise point.

18. The method of claim 17, wherein the determining step comprising, based on a continuity in distance between range points in vertically adjacent irradiation areas, of the plurality of subject range points, determine whether or not each of the subject range points is likely to be a noise point.

19. The method of claim 12, wherein the determining step comprising determining whether or not there is a range point acquired in the past within a predetermined reference distance from a subject range point to be determined whether to be a noise point, and if there is no range point acquired in the past within the reference distance from the subject range point, then determining that the subject range point is likely to be a noise point.

20. The method of claim 12, wherein
the determining step comprises calculating an evaluation value indicative of a likelihood that a range point is a noise point, and
the removing step comprises, if the evaluation value of the range point is equal to or greater than a threshold, then removing the range point, as a noise point.

21. A noise removal method for removing noise points from a plurality of range points, the method comprising steps of:
irradiating each of irradiation areas arranged in a horizontally and vertically extending grid and forming a detection area for detecting a target with laser light and receiving the reflected light from the respective irradiation areas, thereby acquiring a plurality of range points representing per-irradiation area coordinates of the target;
based on either or both of degrees of angle proximity and degrees of distance proximity between a plurality of subject range points to be determined whether to be a noise point, of the plurality of range points, as viewed from a reference point, determining whether or not each of the subject range points is a noise point; and
removing the noise points from the plurality of range points,
wherein the determining step comprising determining whether or not there is a range point acquired in the past within a predetermined reference distance from a subject range point to be determined whether to be a noise point, and if there is no range point acquired in the past within the reference distance from the subject range point, then determining that the subject range point is likely to be a noise point, and
the determining step comprises determining whether or not there is a cluster of range points acquired in the past within a reference distance from a subject cluster of range points to be determined whether to be a noise point, and if there is no cluster of range points acquired in the past within the reference distance from the subject cluster, then determining the subject cluster of range points is likely to be a noise point.

22. A noise removal method for removing noise points from a plurality of range points, the method comprising steps of:

irradiating each of irradiation areas arranged in a horizontally and vertically extending grid and forming a detection area for detecting a target with laser light and receiving the reflected light from the respective irradiation areas, thereby acquiring a plurality of range points representing per-irradiation area coordinates of the target;

based on either or both of degrees of angle proximity and degrees of distance proximity between a plurality of subject range points to be determined whether to be a noise point, of the plurality of range points, as viewed from a reference point, determining whether or not each of the subject range points is a noise point; and removing the noise points from the plurality of range points, wherein the determining step comprises calculating an evaluation value indicative of a likelihood that a range point is a noise point, the removing step comprises, if the evaluation value of the range point is equal to or greater than a threshold, then removing the range point, as a noise point, and the determining step comprises calculating single or plural evaluation values, and the removing step comprises removing a range point, for which a weighted sum of the single or plural evaluation values is equal to or greater than a threshold, as a noise point.

* * * * *